US007732560B2

(12) United States Patent
Lee et al.

(10) Patent No.: US 7,732,560 B2
(45) Date of Patent: Jun. 8, 2010

(54) TERPHENYL DIHYDROXY MONOMERS CONTAINING FLUORINE AND FLUORINATED POLY(ARYLENE ETHER SULFIDE)S

(75) Inventors: Jae-Suk Lee, Gwangju (KR); Kwan-Soo Lee, Gwangju (KR)

(73) Assignee: Gwangju Institute of Science of Technology, Gwangju (KR)

( * ) Notice: Subject to any disclaimer, the term of this patent is extended or adjusted under 35 U.S.C. 154(b) by 0 days.

(21) Appl. No.: 12/435,112

(22) Filed: May 4, 2009

(65) Prior Publication Data

US 2009/0259017 A1 Oct. 15, 2009

Related U.S. Application Data

(62) Division of application No. 11/301,144, filed on Dec. 12, 2005, now abandoned.

(30) Foreign Application Priority Data

Dec. 13, 2004 (KR) ...................... 10-2004-0105085
Sep. 16, 2005 (KR) ...................... 10-2005-0086575

(51) Int. Cl.
  *C08G 75/04* (2006.01)
(52) U.S. Cl. .................................................... 528/374
(58) Field of Classification Search ................. 528/374
  See application file for complete search history.

(56) References Cited

OTHER PUBLICATIONS

Kim et al., "Low-Loss Fluoriated Poly(arylene ether sulfide)s for Optical Waveguide Devices", Polymer Reprints, 42(2), pp. 250-251, 2001.*
Jae-Pil Kim et al. Fluorinated poly(arylene ether sulfide) for polymeric optical waveguide devices. Macromolecules. 2001, 34: 7817-7821.
Jae-Wook et al. Low-loss fluorinated poly(arylene ether sulfide) waveguides with high terminal stability. Journal of Lightwave Teclnology. Jun. 2001, 19: 872-875.
Jae-Wook et al. Structure-property relationship of fluorinated co-poly(arylene ether sulfide)s and co-poly(arylene ether sulfide)s for low-loss and low-birefringence waveguide devices. Journal of Lightwave Technology. Jan. 2005, 23: 364-373.

* cited by examiner

*Primary Examiner*—Deborah D Carr
(74) *Attorney, Agent, or Firm*—Frommer Lawrence & Haug LLP; Ronald R. Santucci

(57) ABSTRACT

The present invention relates to terphenyl dihydroxy monomers containing fluorine and fluorinated poly(arylene ether sulfide)s prepared by using the monomers, more particularly, terphenyl dihydroxy monomers containing both two hydroxy functional groups and fluorine and fluorinated poly(arylene ether sulfide)s prepared by an aromatic nucleophilic substitution polymerization ($S_NAr$) using the monomers, which are thus useful as optical materials in the field of information telecommunications.

2 Claims, 28 Drawing Sheets

Fig. 5
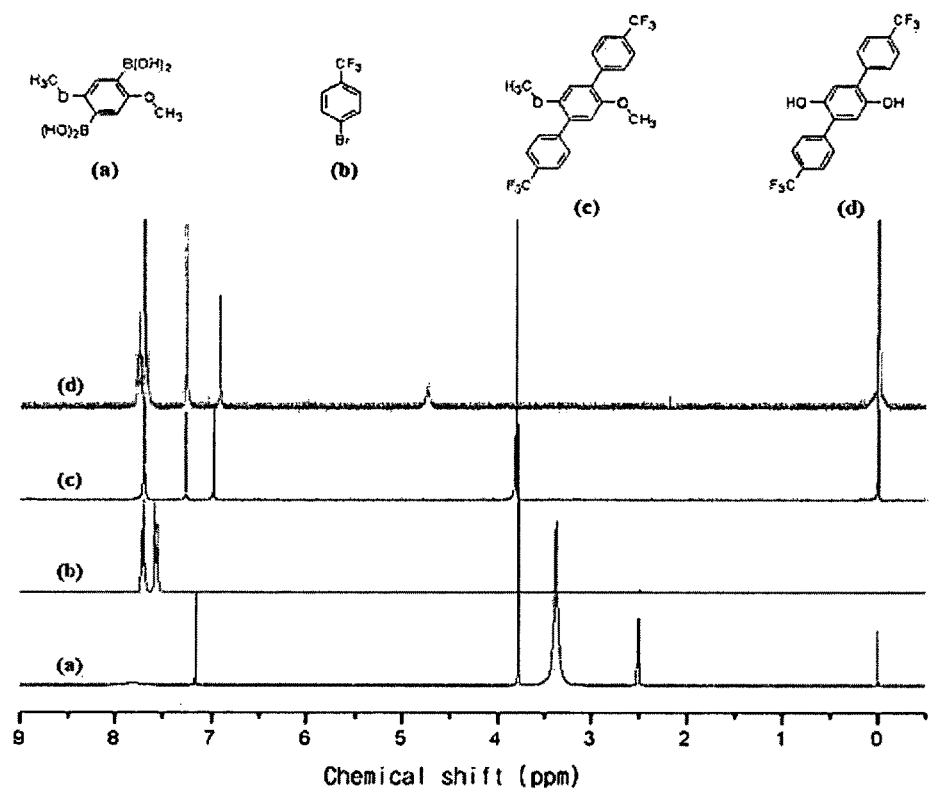
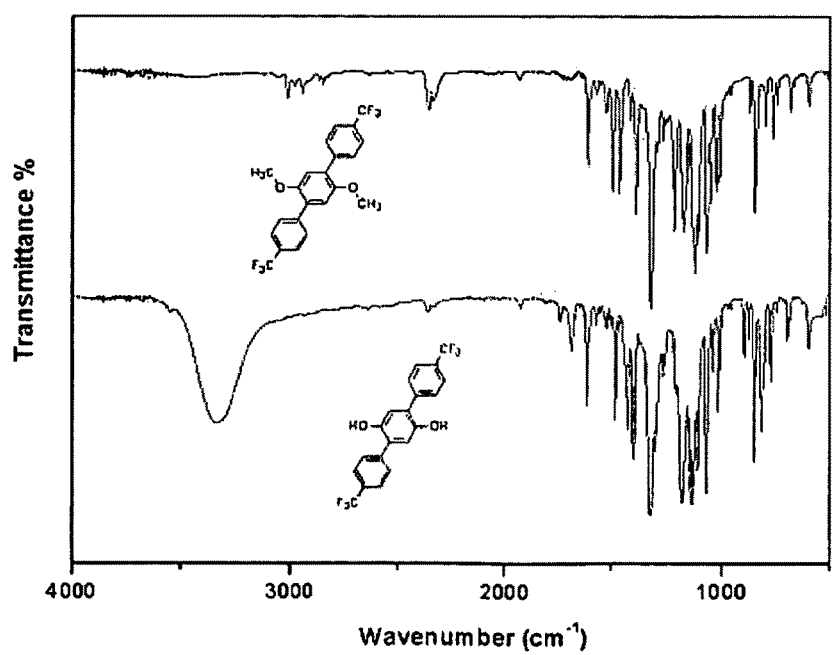
Fig. 6

Fig. 29
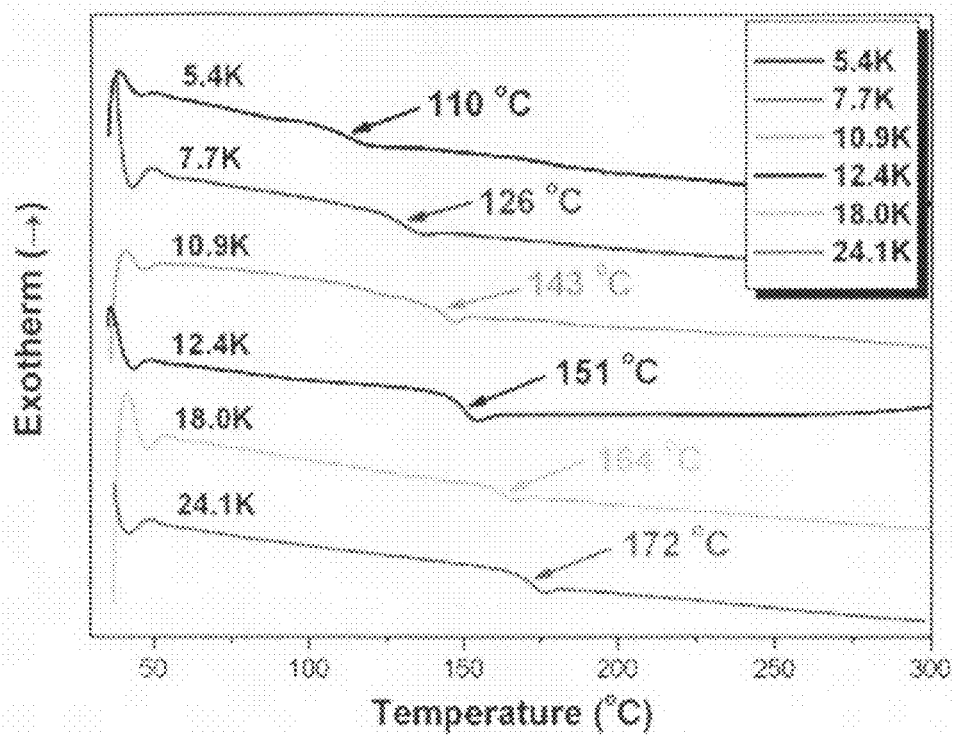
Fig. 30
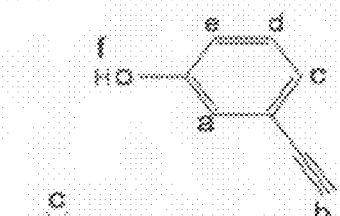
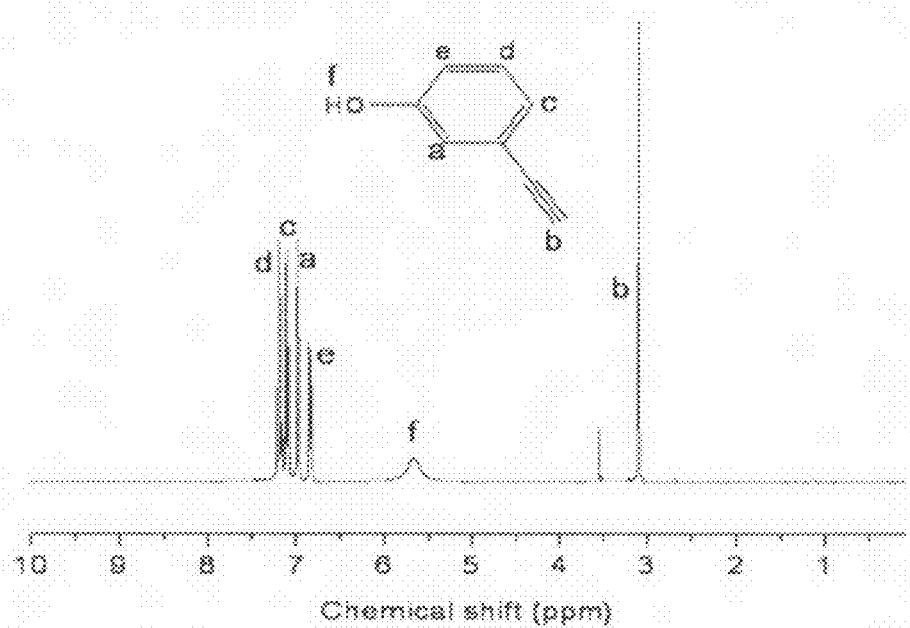

TERPHENYL DIHYDROXY MONOMERS CONTAINING FLUORINE AND FLUORINATED POLY(ARYLENE ETHER SULFIDE)S

This application is a division of U.S. patent application Ser. No. 11/301,144 filed Dec. 12, 2005 now abandoned which claims priority benefits of Korean Patent Application No. 10-2004-0105085 filed Dec. 13, 2004 and Korean Patent Application No. 10-2005-0086575 filed Sep. 16, 2005, the disclosures of which are hereby incorporated by reference.

FIELD OF THE INVENTION

The present invention relates to terphenyl dihydroxy monomers containing fluorine and fluorinated poly(arylene ether sulfide)s prepared by utilizing the monomers, more particularly, terphenyl dihydroxy monomers containing both two hydroxy functional groups and fluorine and fluorinated poly(arylene ether sulfide)s prepared by an aromatic nucleophilic substitution polymerization ($S_NAr$) utilizing the monomers, which are thus useful as optical materials in the field of information telecommunications.

BACKGROUND OF THE INVENTION

It is an essential condition to transmit a big volume of data at high speed in image processing, transmission media and telephone network. There is a need for several hundreds Mbps (mega bit per second) for mass storage of data at high speed and transmission speed at the rate of Tbps (tera bit per second) will be requested in the future.

Optical communication has been addressed as a solution for rapid processing of a huge volume of data. Particularly, wavelength division or frequency division multiplexing system utilizing parallellism of light of optical communication systems has been more in the spotlight than time division multiplexing system. Typical elements for optical communications include optical output splitter, wavelength division multiplexer, high speed optical modulator, switch, and so on. It is required that elements for optical waveguides have stabilities against optical loss, heat and humidity, polarization-dependent gain (PDG), easiness in processing and packaging, and so on. Silica has been widely used in the preparation of passive optical waveguides so far but studies in development using polymers containing hydrogen or fluoride have recently extensively increased.

Poly(arylene ether) is engineering plastic used widely in electronic materials and aerospace materials. Generally, fluorine-containing poly(arylene ether) or polyimide exhibits high thermal stability, chemical stability, low optical loss, low refractive index, low birefringence, low dielectric constant, easy processability, and low moisture absorption rate. It has been thus suitable for manufacturing elements used in information telecommunication field as well as use in thermoplastic polymer, membrane elastomer and so on. Especially, poly (arylene ether sulfide) (hereinafter referred to as 'PAESIs') has been introduced with a sulfur group for providing mechanical stability, thermal stability, resistance against fire, chemical stability, low birefringence, and low moisture absorption rate and an ether group for providing flexibility thereby providing superior advantage in manufacturing elements, while exhibiting similar properties of polyimides. Udel™ (poly ether sulfone), Kadel™ (poly ether ketone), PEEK™ [Poly (ether ether ketone)], and Victrex™ have been commercialized. Fluorinated poly(arylene ether sulfide) (hereinafter referred as to 'FPAESIs') has been in the spotlight because ether bond offers flexibility to the polymer main chain and kink structure of the polymer main chain. Thus, it provides high glass transition temperature due to correlation/canceling effect between irregular and regular structure. Aromatic nucleophilic substitution reaction ($S_NAr$) is usually performed to prepare the FPAESIs, where monomers with dihydroxy functional group are used. A typical example of the dihydroxy monomer used in the preparation of FPAESIs is 4,4'-(hexafluoroisoproylidene)diphenol. Although other examples of fluorine-containing dihydroxy monomer include 9,9'-bis(4-hydroxyphenyl)fluorene, 2,2',3,3',5,5'6,6'-octafluoro-4,4'-biphenol hydrate, 4,4'-isopropylidenediphenol, 4,4'-(hexafluoroisoproylidene)diphenol, there are limited for FPAESIs.

SUMMARY OF THE INVENTION

Although it has been known that poly(arylene ether sulfide) as a fluorine(F)-containing polymer has a variety of applications in industry purpose including the field of information telecommunication, fluorine-containing dihydroxy monomers known till today are still limited because there are very hindered problems to prepare poly(arylene ether sulfide)s having physico-chemical characteristics. The present invention has been developed to solve the foregoing problems, and it is therefore an object of the invention to provide fluorine-containing terphenyl dihydroxy monomers and a process for preparing the same.

Another object of the invention is to provide poly(arylene ether sulfide)s prepared by the polymerization of the terphenyl dihydroxy monomer described above and a process for preparing the same.

BRIEF DESCRIPTION OF DRAWINGS

FIG. 5 is $^1$H-NMR spectra of 2,5-dimethoxy-1,4-benzenediboronic acid, 4-bromobenzotrifluoride, 6FDMTP, and 6FTPDO.

FIG. 6 is FT-IR spectra of 6FDMTP and 6FTPDO.

FIG. 29 is a graph illustrating Glass transition temperature of FPAESI-12Fs according to molecular weight.

FIG. 30 is a $^1$H-NMR spectrum of 3-ethynylphenol.

DETAILED DESCRIPTION OF THE INVENTION

Figure 1:
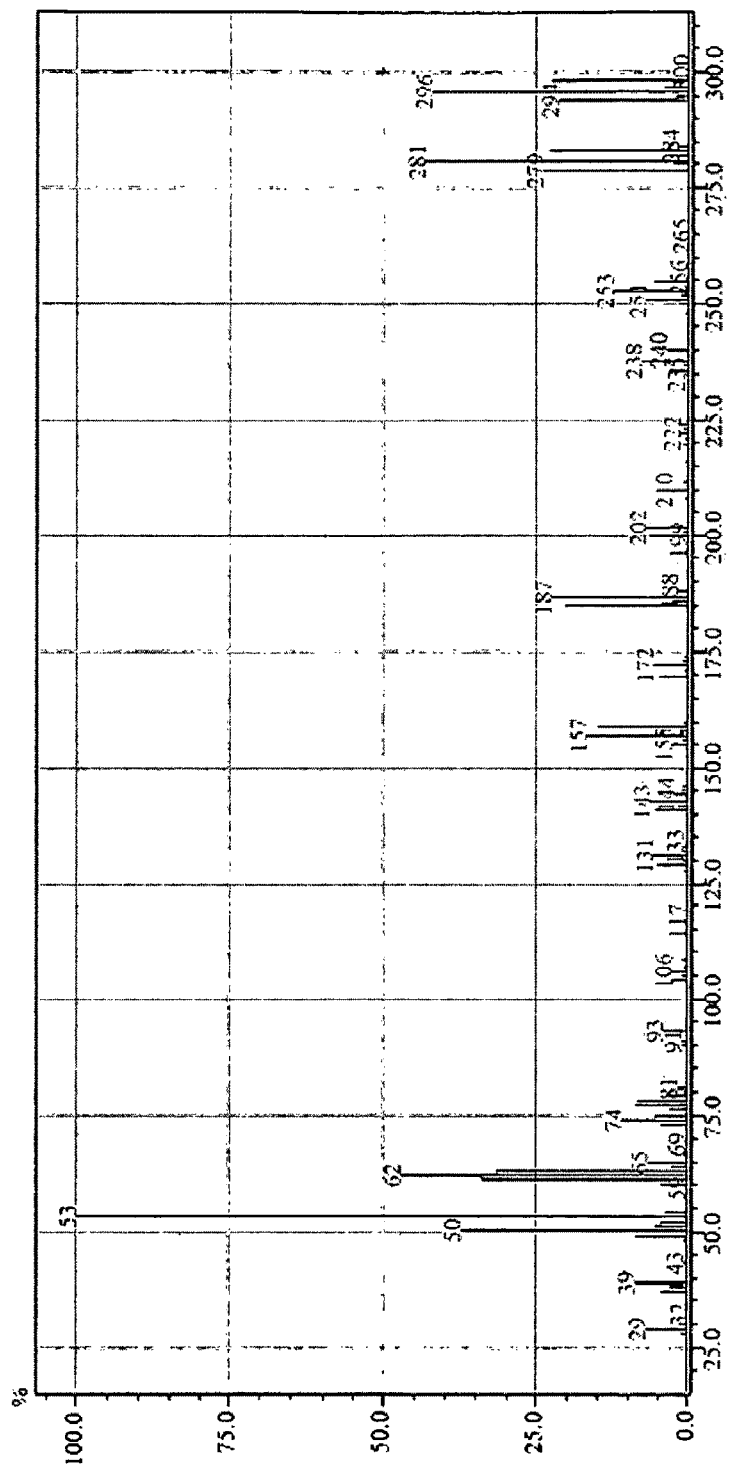
FIG. 1 is a GC-MASS spectrum of 1,4-dibromo-2,5-dimethoxy benzene.

The present invention is to provide terphenyldihydroxy monomers expressed by the formula 1;

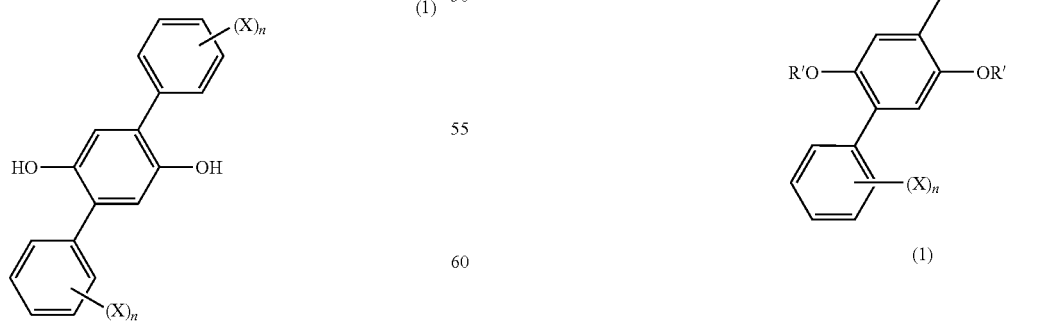

(1)

wherein X is F or fluoroalkyl of from 1 to 6 carbon atoms; and n represents the number of X as a substituent and is an integer of 1 to 5.

Hereinafter, the present invention is described in more detail.

Since a novel dihydroxy monomers expressed by the following formula 1 contains fluorine (F), polymers prepared by polymerizing the monomers have physical properties typically are endowed with fluorine-containing polymers, for example, thermal stability, chemical stability, low optical losses, low refractive index, low dielectric constant, good processability, and low moisture absorption rate, thus being useful as optical materials in the field of information telecommunications.

Examples of fluorine-containing terphenyl dihydroxy monomer include 2',5'-dimethoxy-4,4"-bis-trifluoromethyl-[1,1';4',1"]terphenyl; 4,4"-bis-trifluoromethyl-[1,1',4',1"]terphenyl-2',5'-diol; 2',5'-dimethoxy-3,5,3",5"-tetrakis-trifluoromethyl-[1,1',4',1"]terphenyl; 3,5,3",5"-tetrakis-trifluoromethyl-[1,1',4',1"]terphenyl-2',5'-diol; 2,3,5,6,2",3", 5",6"-octafluoro-2',5'-dimethoxy-4,4"-bis-trifluoromethyl-[1,1',4',1"]terphenyl; and 2,3,5,6,2",3", 5", 6"-octafluoro-4, 4"-bis-trifluoromethyl-[1,1',4',1"]terphenyl-2',5'-diol.

A process for preparing the monomer expressed by formula 1 is described in the following scheme 1;

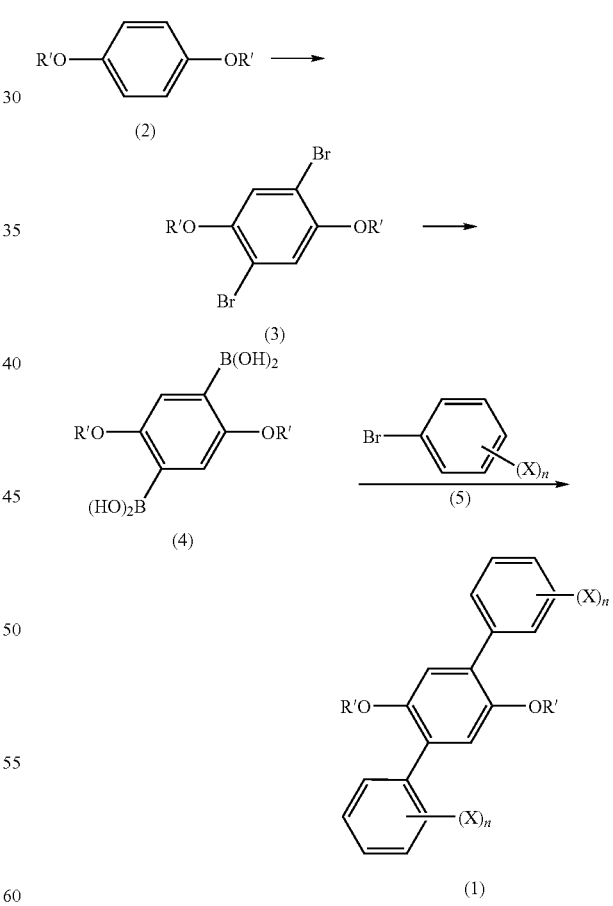

Scheme 1

(1)

wherein R' is alkyl of from 1 to 6 carbon atoms; R is a hydrogen atom or an alkyl group having 1 to 6 carbon atoms; X is F or a fluoroalkyl group having 1 to 6 carbon atoms; and n represents the number of X as a substituent and is an integer of 1 to 5.

The monomer expressed by the formula 1, when R is hydrogen, cannot be prepared with a step due to the reactivity between a hydroxy group and a fluorine atom. Thus, 1,4-dialkoxybenzene substituted with an alkoxy group instead of a hydroxy group is used as a starting material which is further reacted with a fluorine-containing compound via Suzuki cross-coupling reaction. The alkoxy group is then converted to a hydroxy group at the last step.

The process for preparing the monomer according to Scheme 1 is described in more detail as follows.

1,4-dibromo-2,5-dialkoxybenzene expressed by formula 3 is prepared by bromination of 1,4-dialkoxybenzene expressed by formula 2. A typical bromination is performed using bromine ($Br_2$) and iodine ($I_2$) at room temperature. The solvent used is a typical organic solvent, for example, dichloromethane ($CH_2Cl_2$), acetic acid, toluene, hexane, tetrahydrofuran (THF), N,N-dimethylformamide (DMF), dimethyl sulfoxide (DMSO), and the like. After bromination, it is treated with an aqueous potassium hydroxide solution is performed to remove the un-reacted bromine ($Br_2$) and iodine ($I_2$).

1,4-Dibromo-2,5-dialkoxybenzene expressed by formula 3 is converted to 2,5-dialkoxy-1,4-benzenediboronic acid expressed by formula 4. Grignard reagent is first prepared by the reaction of magnesium (Mg), dibromoethane, and tetrahydrofuran at a temperature of 70-90° C., the bromo compound is then converted to a desired boronic acid compound by slowly adding trimethylborate, while keeping its temperature at −90 to −50° C., stirring at room temperature, hydrolyzing at a temperature of −30 to 10° C., and neutralizing with sulfuric acid.

2,5-Dialkoxy-1,4-benzeneboronic acid expressed by formula 4 is further reacted with fluorine-substituted bromobenzene expressed by formula 5 via Suzuki cross coupling reaction to produce a target compound expressed by formula 1, wherein R is alkyl. Suzuki cross-coupling reaction is performed under the presence of alkali metal base and palladium catalyst at a temperature of 60 to 140° C. via a conventional method. The alkali metal base is selected from sodium carbonate, potassium carbonate, sodium hydroxide, potassium hydroxide and the like. Example of palladium catalyst include tetrakis(triphenylphosphine)palladium (Pd(PPh$_3$)$_4$), palladium acetate, palladium chloride, and the like. A typical organic solvent is used as a solvent, especially tetrahydrofuran (THF), N,N-dimethylformamide (DMF), toluene, pentane, dioxane, ethylene glycol, dimethyl ether (DME), dimethylacetamide (DMA), and the like.

In order to prepare the monomer expressed by formula 1, wherein R is hydrogen, a hydrolysis is performed using an appropriate acid selected from hydrochloric acid, bromic acid/acetic acid, iodic acid, trifluoroacetic acid, aluminum chloride, aluminum bromide, aluminum iodide, boron trichloride, boron tribromide, phenylboron dichloride, boron triiodide, boron trifluoride, and the like. Particularly, the hydrolysis is performed with bromic acid/acetic acid at a temperature of 100 to 150° C.

Although each step for preparing the monomer described above has been already known, the characteristics of the present invention lies in the selection of reaction materials and the sequential order of introducing substituents so that desired dihydroxy monomers containing fluorines may be efficiently obtained.

Because of structural characteristics of the monomer having fluorine and hydroxy groups, expressed by formula 1 of the present invention, they can be usefully employed in the polymerization to produce polymers containing fluorine, especially poly(arylene ether sulfide) containing fluorine via aromatic nucleophilic substitution reaction. Accordingly, the present invention is to provide poly(arylene ether sulfide) containing fluorine expressed by the following formula 6;

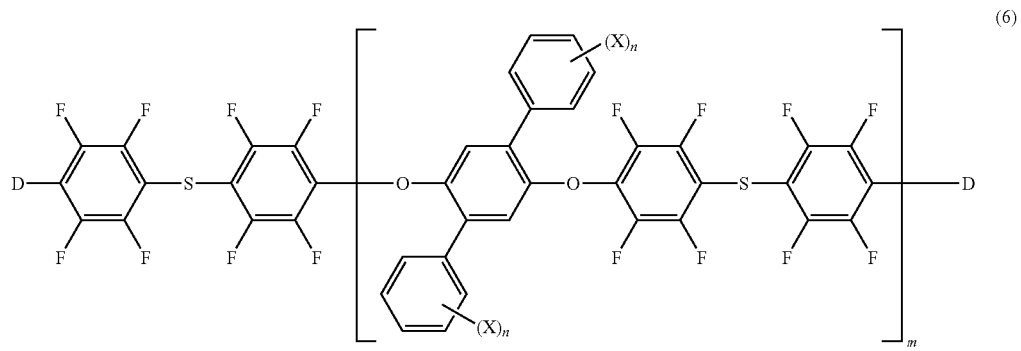

(6)

wherein D is fluorine(F) or ethynylphenoxy, X is hydrogen, fluorine, or fluoroalkyl of from 1 to 6 carbon atoms, n represents the number of X as a substituent and is an integer of 1 to 5, and M represents the number of monomers.

Poly(arylene ether sulfide) expressed by formula 6 of the invention is prepared via nucleophilic substitution ($S_N2$) reaction so that it provides polymers having high molecular weight and controls physical properties such as glass transition temperature (Tg) since it is possible to conduct the polymerization using wanted monomers.

A typical process for preparing poly(arylene ether sulfide) expressed by formula 6 of the invention is shown in the following Scheme 2.

The process according to Scheme 2 comprises:

a) preparing a polymer (D=F) expressed by formula 6a by the polycondensation of terphenyl dihydroxy monomer of formula 1 and sulfide compound of formula 7; and b) preparing a polymer(D=—O—Z) expressed by formula 6b by reacting the polymer of formula 6a with a cross-linkable compound expressed by Z—OH,

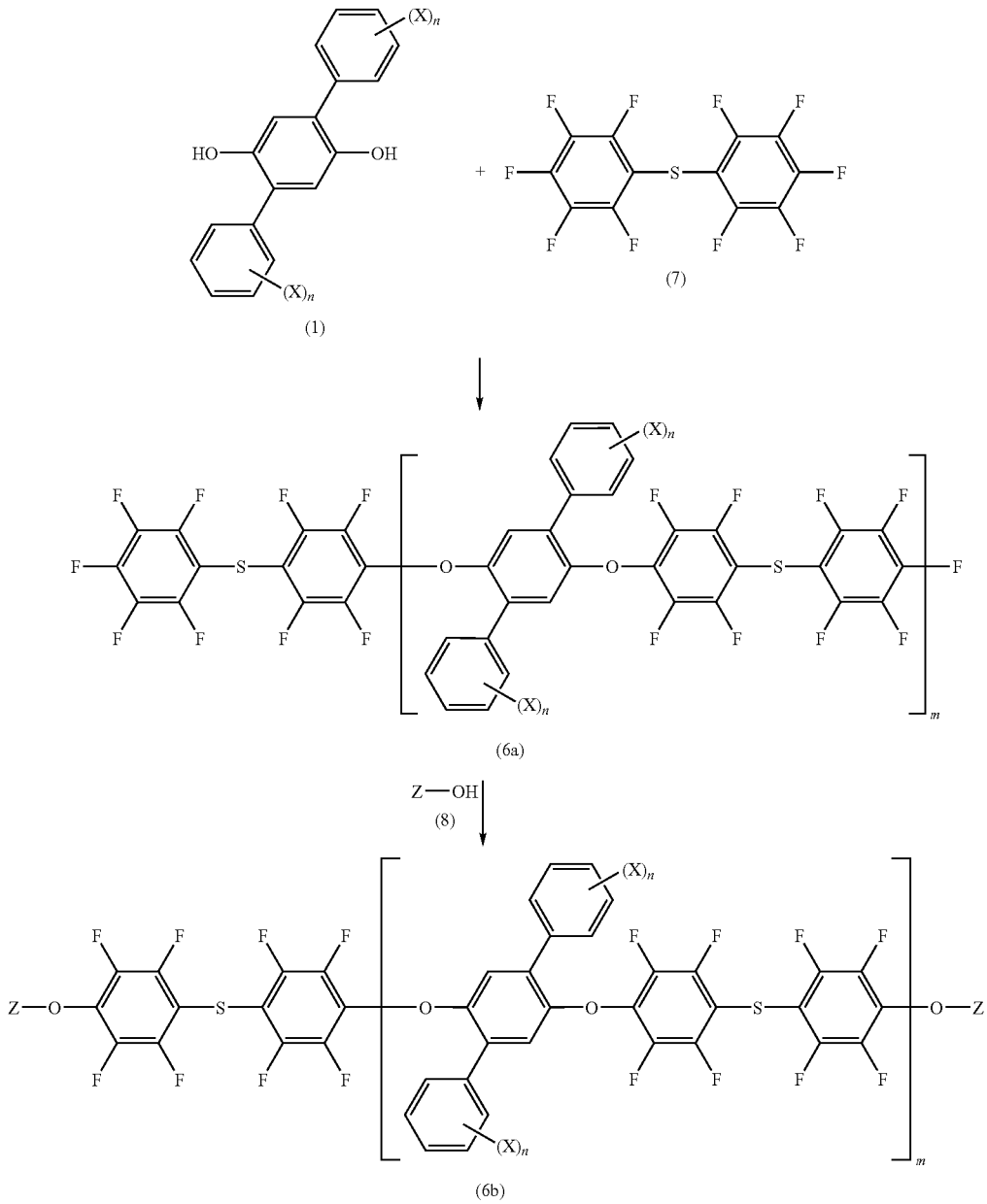

Scheme 2 wherein X is a hydrogen atom, a fluorine atom, or a fluoroalkyl group having 1 to 6 carbon atoms, n represents the number of X as a substituent and is an integer of 1 to 5, M represents the number of monomers, and Z is ethynylphenyl as a cross-linkable group.

In order to obtain the desired polymer of formula 6a is the polycondensation of terphenyl dihydroxy of formula 1 and sulfide compound of formula 7 conducted in the presence of a proper base and an aprotic polar solvent at a temperature of 100 to 200° C. for 2 to 10 hours.

In order to improve thermal stability of the polymer of formula 6a, there is utilized a compound of formula 8 having cross-linkable group at the chain end, for example, ethynylphenol capable of performing thermal cross-linking to be converted to the polymer of formula 6b. Such reaction to introduce the cross-linkable group at the chain end is conducted in the presence of a proper base and an aprotic polar solvent at a temperature of 100 to 200° C. for 2 to 10 hours.

Base used in the polycondensation and addition of the cross-linkable group may be inorganic bases selected from hydroxide, carbonates, and sulfates of alkali metal or alkaline earth metal or organic bases selected from typical amines such as ammonia. The solvent may be a typical aprotic polar solvent such as N-methylpyrolidone (NMP), dimethylformamide (DMF), N,N-dimethylacetamide (DMAc), dimethyl sulfoxide (DMSO), tetrahydrofuran (THF), and the like or an azeotropy solvent selected from benzene, toluene, and the like.

Poly(arylene ether sulfide) prepared by the process described above has average molecular weight of from 3,000 to 100,000, the number of unit (M) of from 5 to 80 and equal or superior thermal stability, low dielectric constant, and low refractive index to conventional polymers containing fluorine. Birefringence of the poly(arylene ether sulfide) is prominently improved.

Having described the invention the following examples are provided as further illustrative of the invention and are not to be construed as limiting the scope of the present invention.

PREPARATION EXAMPLE

Preparation of Terphenyl Dihydroxy Monomer

Preparation Example 1

Preparation of 1,4-dibromo-2,5-dimethoxybenzene

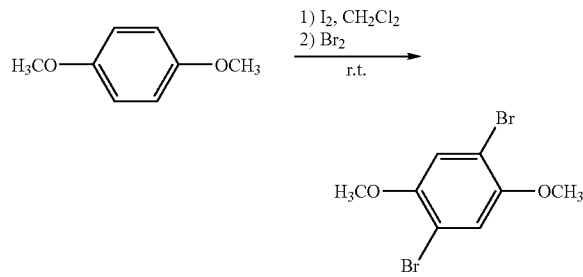

After 1,4-dimethoxybenzene (74.5 mmol), iodine (I$_2$; 0.61 mmol) and dichloromethane were placed into a three-necked round flask charged with N$_2$, bromine (Br$_2$; 178.8 mmol) was slowly added through a dropping funnel at room temperature while any light was screened out. After addition, the reaction solution was heated for 1 hour at 40° C. After the reaction was completed, the reaction solution was poured to 5M of aqueous potassium hydroxide (KOH) solution to remove un-reacted iodine and bromine, and salt form materials were also removed by extraction with dichloromethane and water. The organic layer was then dried over magnesium sulfate. The solvent, dichloromethane, was evaporated under vacuum and thus obtained product was vacuum-dried at 40° C. to produce more than 99% of yield. The product was white solid and its mp was 144-149° C.

Figure 2:
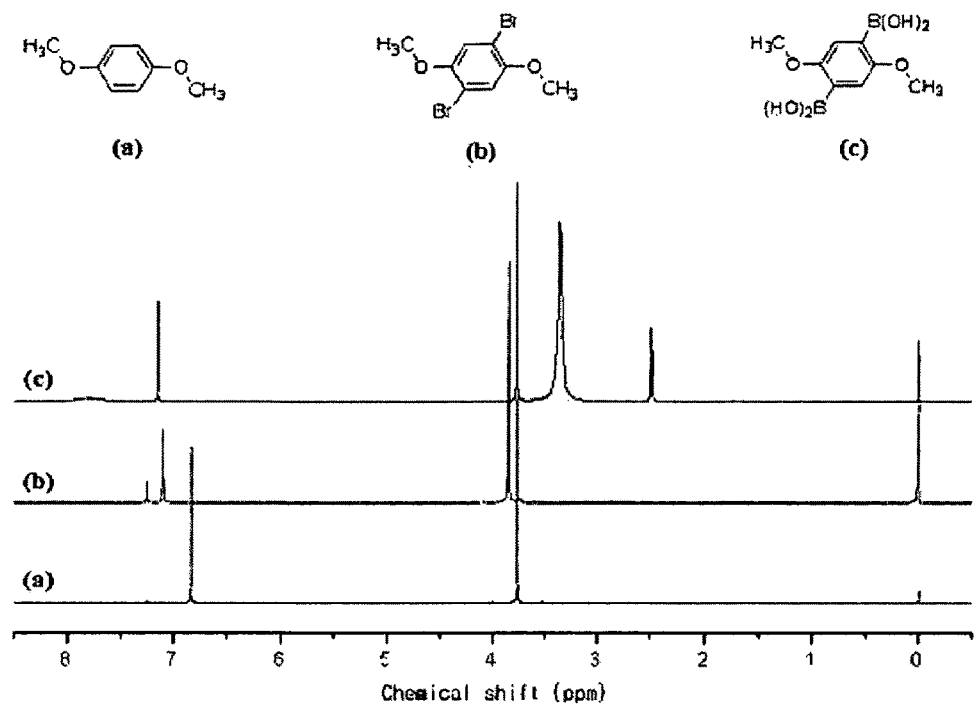
FIG. 2 is $^1$H-NMR spectra of 1,4-methoxy benzene, 1,4-dibromo-2,5-dimethoxy benzene, and 2,5-dimethoxy-1,4-benzenediboronic acid.

Structure analysis was performed with GC-MASS, $^1$H-NMR, and FT-IR. As shown in GC-MASS spectrum of FIG. 1, the peak for parent ion was 296 while the peak for parent ion of aliphatic bromine compounds were 298 and 294 since the ratio of bromine-79 to bromine-81 is 1 to 1 in nature. Alternatively there were three possibilities to obtain 1,4-dibromo-2,5-dimethoxybenzene of which one was substituted with only bromine-79, another was substituted with both bromine-79 and bromine-81, and the other one was substituted with only bromine-81. It was identified that peaks without one methyl group (—CH$_3$) were shown at 279, 281, and 283. It was noted that the hydrogen peak of benzene was deshielded in $^1$H-NMR spectrum of FIG. 2 because bromine, which has greater electronegativity than hydrogen, was substituted so that it withdraws electron density through the inductive effect, resulting in a lower electron density and more downfield chemical shift (higher ppm). Further in the FT-IR spectrum of FIG. 3 it was noted that peaks shown for the starting material 1,4-dimethoxybenzene at 1968, 1867 cm$^{-1}$, which are in the range for peaks for para-substituted benzene compound, 2000 to 1667 cm$^{-1}$, were disappeared after the reaction. In addition, it was identified that C-1, C-2, C-4, and C-5 positions of benzene were substituted through peaks at 1793, 1700 cm$^1$.

Preparation Example 2

Preparation of 2,5-dimethoxy-1,4-benzeneboronic acid

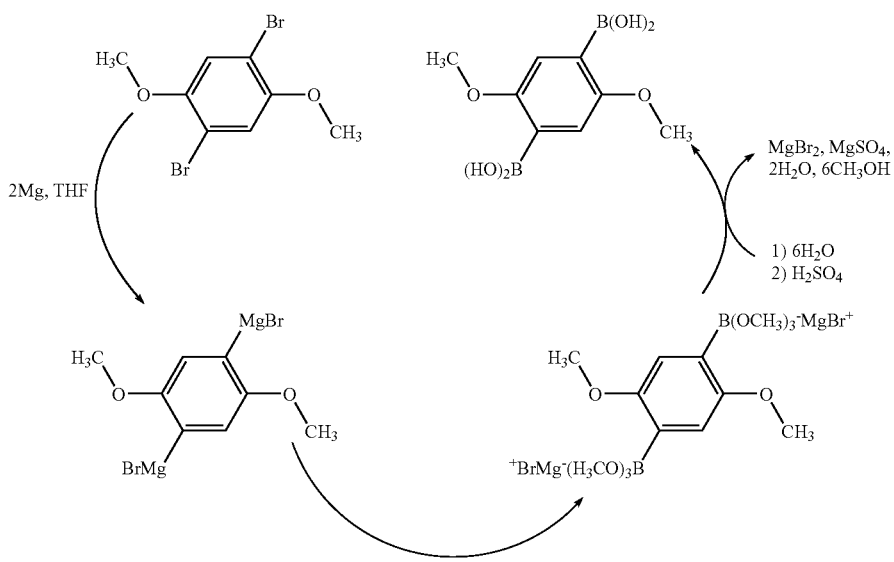

A three-necked round flask charged with N$_2$ and equipped with a condenser, a dropping funnel and a magnetic stirrer was added with magnesium and heated to remove moisture completely, and then further added with tetrahydrofuran (10 mL) and dibromoethane (0.1 mL) to activate. After observing color change from clear color to dark brown with activation of magnesium, tetrahydrofuran and 1,4-dibromo-2,5-dimethoxybenzene dissolved in tetrahydrofuran were slowly added alternatively to the reaction flask. After addition, the reaction solution was refluxed at a temperature of 80° C. for 1 hour. Then, the reaction flask was cooled in a double boiler with acetone and dry ice to −60° C. and trimethyl borate was added through a dropping funnel for 20 to 30 min. After the double boiler was removed and the reaction solution was warmed to room temperature, tetrahydrofuran (40 mL) was added and reacted for 24 hours. Water was added for hydrolysis while the temperature was kept at 0° C. and an aqueous sulfuric acid solution (33.6 mL of sulfuric acid in 680 mL of water) was added to neutralize the compound. The reaction solution was extracted with diethyl ether and organic layer was dried over magnesium sulfate. Diethyl ether was evaporated under vacuum and residue was recrystallized from a mixture of acetonitrile and water to yield a target product, followed by vacuum-dry at 60° C. The yield was 52% and the final product was white solid and its mp was over 250° C.

Structure analysis was performed with EA (element analysis), $^1$H-NMR, $^{13}$C-NMR, and FT-IR. As a result of EA, each value of carbon (C) and hydrogen (H) of 2,5-dimethoxy-1,4-benzeneboronic acid was 43.68 and 5.38, respectively which were almost equal to the theoretical weight, 42.55, 5.36, for $C_8H_{12}B_2O_6$. A peak at 7.80 ppm for hydroxy group (—OH) was appeared in $^1$H-NMR of FIG. 2 and peaks for hydrogen and methyl group of benzene were also distinctive. Area ratio of peaks were precisely correspond which exhibited the formation of 2,5-dimethoxy-1,4-benzeneboronic acid. In $^{13}$C-NMR of FIG. 3 it was identified that pure compound was prepared since each carbon peak in different circumstance was shown at 55.84, 116.86, 124.56, and 157.47 ppm. In FT-IR spectrum of FIG. 3 it was obvious that boronic acid (—B(OH)$_2$) was formed with a peak of hydroxy group (—OH) at 3366 cm$^{-1}$ which was not shown with 1,4-dibromo-2,5-dimethoxybenzene. Therefore, the formation of 2,5-dimethoxy-1,4-benzeneboronic acid was identified with EA, $^1$H-NMR, $^{13}$C-NMR, and FT-IR.

Preparation Example 3

Preparation of 2',5'-dimethoxy-4,4'-bis-trifluoromethyl-[1,1',4',1'']terphenyl (6FDMTP)

A two-necked round flask charged with N$_2$ and equipped with a condenser and a magnetic stirrer was added with 2,5-dimethoxy-1,4-benzeneboronic acid (6.64 mmol), 4-bromobenzotrifluoride (12.28 mmol), tetrahydrofuran (50 mL), and then further added with 2M of aqueous potassium carbonate solution (25 mL), tetrakis(triphenylphosphine)palladium (Pd(PPh$_3$)$_4$; 5 mol %) of a catalyst was added. The reaction mixture was reacted under N$_2$ at 80° C. for 8 hours. After the reaction was completed, the reaction mixture was extracted with dichloromethane and organic layer was then washed with water several times. The washed solution was dried over magnesium sulfate. After filtration, filtrate was condensed under vacuum to remove dichloromethane and any un-reacted material from the residue was removed by running column chromatography and the result was recrystallized from dichloromethane to yield a target product. The product was white solid and its mp was 192-194° C.

Figure 4:
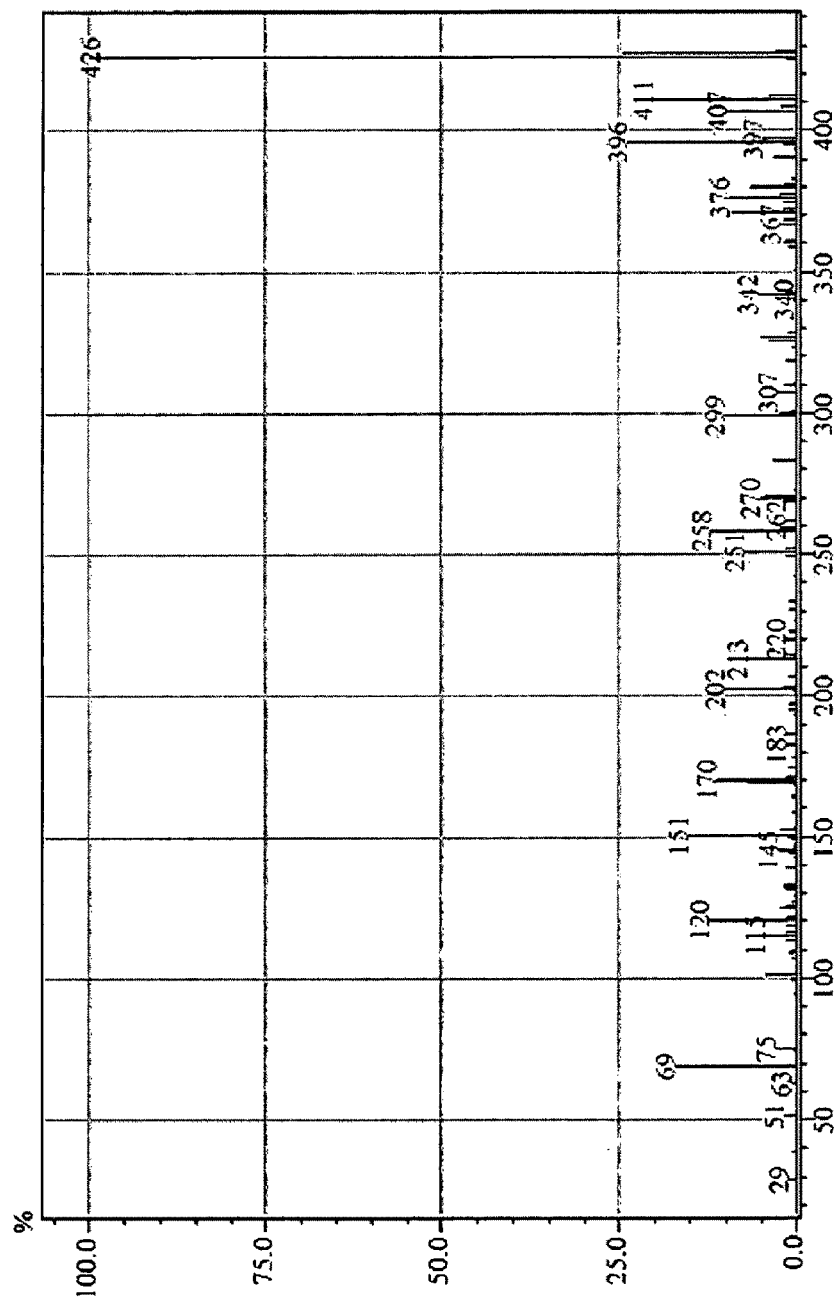
FIG. 4 is a GC-MASS spectrum of 6FDMTP.

Structure analysis was performed with GC-MASS, $^1$H-NMR, $^{19}$F-NMR, and FT-IR. As shown in GC-MASS spectrum of FIG. 4, the peak for parent ion was the highest at 426 while the peak without one methyl group was 411 and peak without two methyl groups was 396, respectively. In $^1$H-NMR spectrum of FIG. 5 it was noted that the peak for boronic acid was disappeared and new peaks for hydrogens of 4-bromobenzotrifluoride were shown at 7.70, 6.98 ppm, which identifies the formation of 6FDMTP. At here, area ratio of each hydrogen peak was also exactly matched. In $^{19}$F-NMR spectrum it was identified that the Suzuki cross-coupling reaction was successfully achieved with new fluorine peak at −59.74 ppm. In FT-IR spectrum of FIG. 6 it was noted that substitution of trifluoromethyl benzene group was achieved with appearance of C-F peak at 1122 cm$^{-1}$ and disappearance of hydroxy group of boronic acid which further identified the formation of 6FDMTP. According to the analysis described above, it was noted that Suzuki cross-coupling reaction was successfully accomplished.

Preparation Example 4

Preparation of 4,4''-bis-trifluoromethyl-[1,1',4',1'']terphenyl-2',5'-diol (6FTPDO)

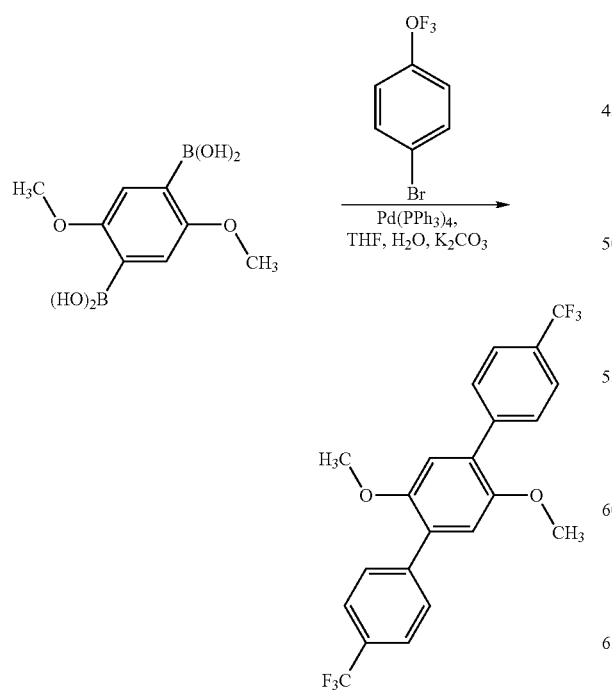

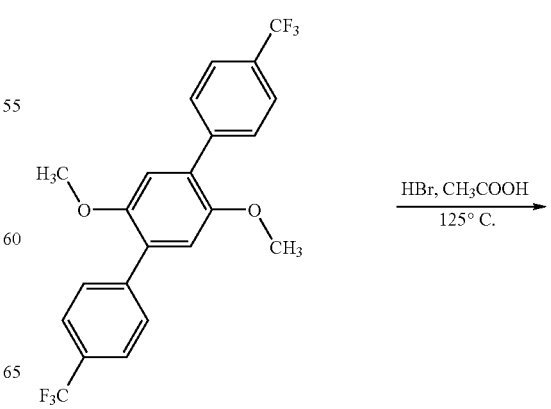

-continued

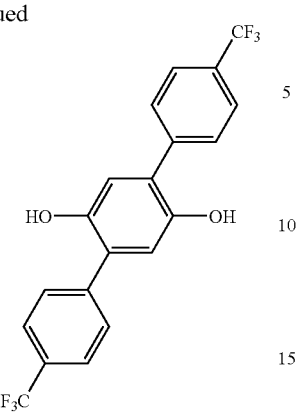

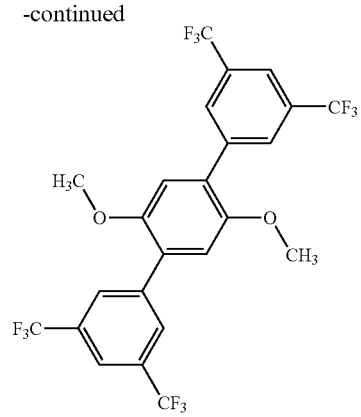

A two-necked round flask charged with $N_2$ and equipped with a condenser, a dropping funnel, and a magnetic stirrer was added with 6FDMTP and acetic acid placed, and then further added with HBr slowly through the dropping funnel. The reaction mixture was then reacted at 125° C. for 48 hours. The reaction mixture was precipitated over water and filtered to obtain a white solid target product. The product was then vacuum-dried at 60° C. and yield was 96% and its mp was 188-190° C.

Figure 7:
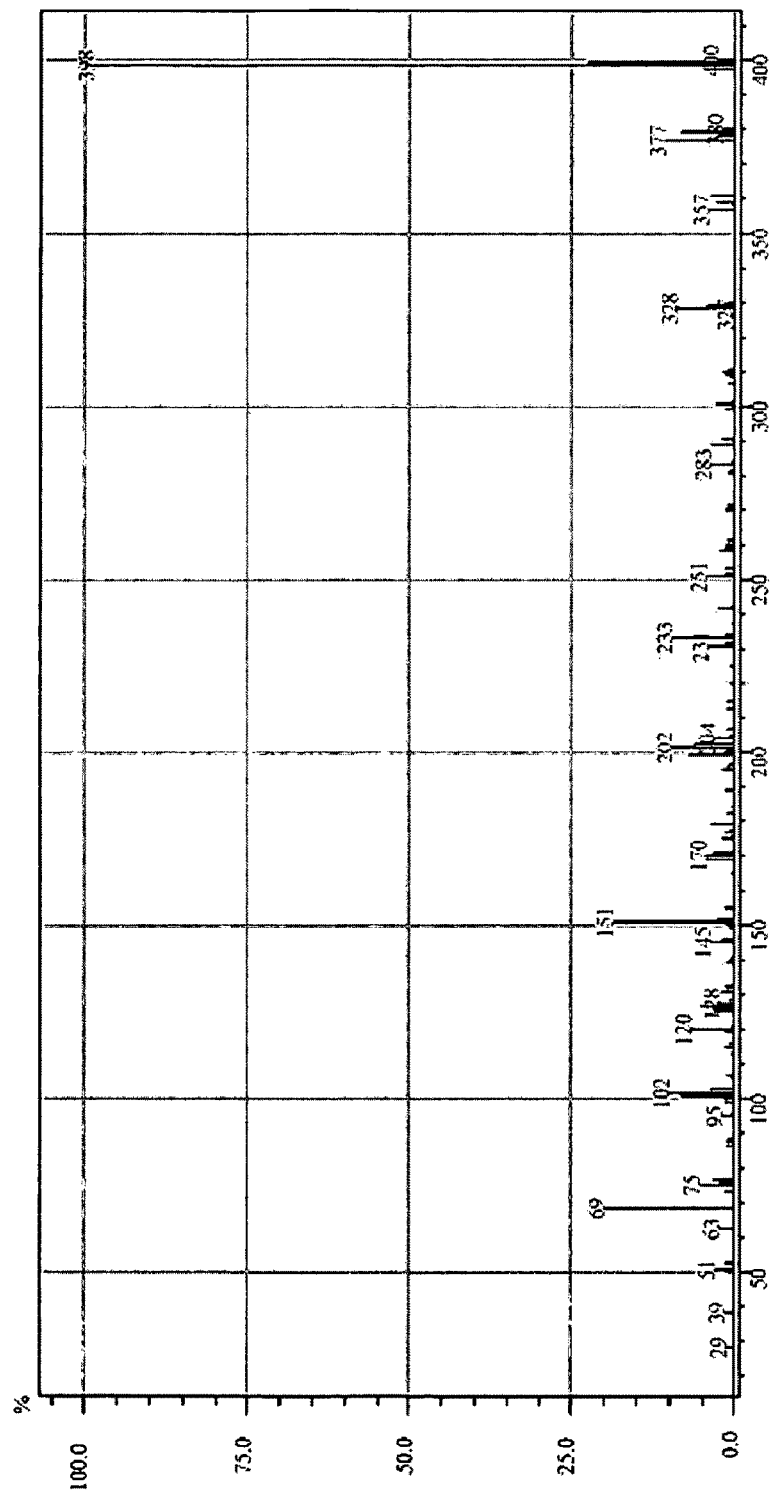
FIG. 7 is a GC-MASS spectrum of 6FTPDO.

Structure analysis was performed with GC-MASS, $^1$H-NMR, $^{19}$F-NMR, and FT-IR. As shown in GC-MASS spectrum of FIG. 7 was a very high peak for the parent ion exhibited at 398. It was identified with $^1$H-NMR spectrum of FIG. 5 that 6FTPDO was successfully formed since hydrogen peaks of the methyl group of 6FDMTP at 3.81 ppm was disappeared and a new peak corresponding to the hydroxy group at 4.75 ppm was appeared. There was almost no change in $^{19}$F-NMR spectrum although the peak for fluorine was shown at −59.89 ppm. It was further proved the formation of the desired product because the peak corresponding to the hydroxy group was shown at 3338 cm$^{-1}$ and the peak corresponding to C-H of the methyl group was disappeared in FT-IR spectrum of FIG. 6.

Preparation Example 5

Preparation of 2',5'-dimethoxy-3,5,3'',5''-tetrakis-trifluoromethyl-[1,1',4',1'']terphenyl (12FDMTP)

The process was performed same as in Preparation Example 3 except using 3,5-bistrifluoromethylbromobenzene as a starting material instead of 4-bromobenzotrifluoride. The yield was 95% and its mp was 193-195° C.

Figure 8:
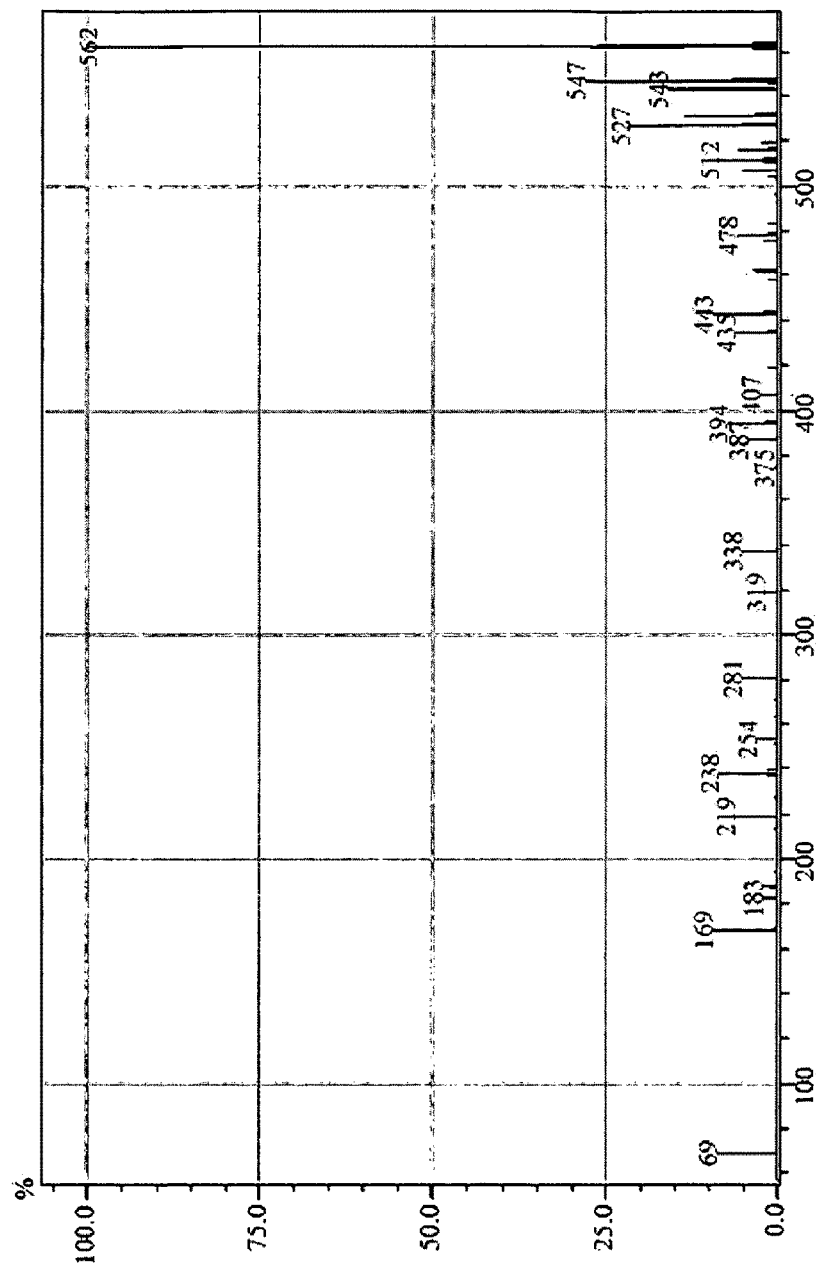
FIG. 8 is a GC-MASS spectrum of 12FDMTP.
Figure 9:
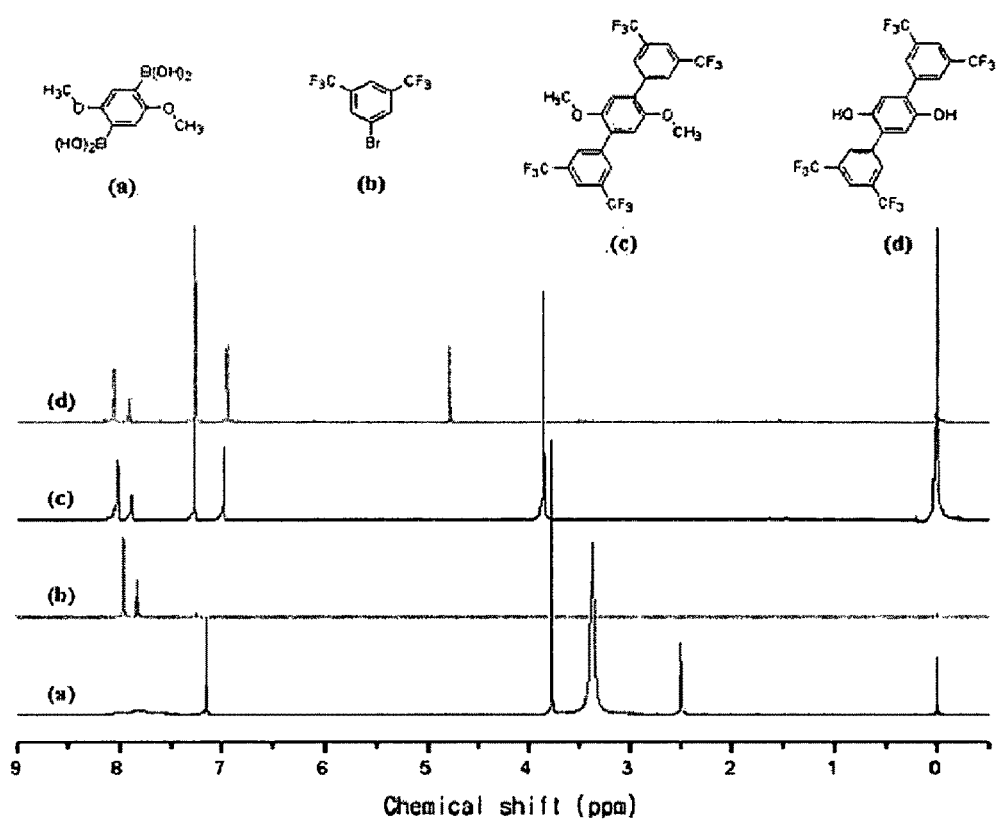
FIG. 9 is $^1$H-NMR spectra of 2,5-dimethoxy-1,4-benzenediboronic acid, 3,5-bistrifluoromethylbromobenzene, 12FDMTP, and 12FTPDO.
Figure 10:
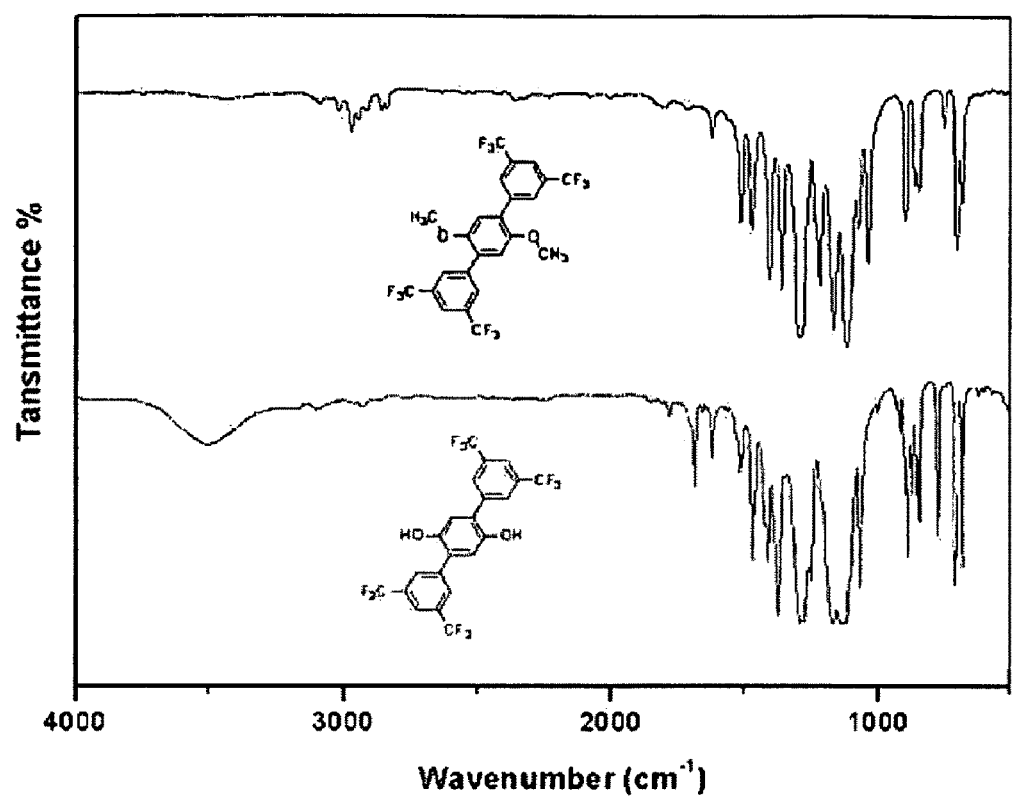
FIG. 10 is FT-IR spectra of 12FDMTP and 12FTPDO.

Structure analysis was performed with GC-MASS, $^1$H-NMR, and $^{19}$F-NMR, FT-IR. As shown in GC-MASS spectrum of FIG. 8 was a very high peak for the parent ion exhibited at 562 and a peak without one methyl group was shown at 547. It was identified with $^1$H-NMR spectrum of FIG. 9 that 12FDMTP was successfully formed since the peak for boronic acid was disappeared and new peaks corresponding to hydrogens of 3,5-bistrifluoromethylbromobenzene were appeared at 7.87, 8.01 ppm. Area ratio of each hydrogen peak was precisely corresponded which exhibited the formation of 12FDMTP. In $^{19}$F-NMR spectrum it was identified that the Suzuki cross-coupling reaction was successfully achieved with new fluorine peak at −60.03 ppm. In FT-IR spectrum of FIG. 10 it was noted that substitution of trifluoromethyl benzene group was achieved with appearance of C-F peak at 1118 cm$^{-1}$ and disappearance of hydroxy group of boronic acid, which further identified the formation of 12FDMTP. From the above analyses, it was noted that Suzuki cross-coupling reaction was successfully accomplished.

Preparation Example 6

Preparation of 3,5,3'',5''-tetrakis-trifluoromethyl-[1,1',4',1'']terphenyl-2',5'-diol (12FTPDO)

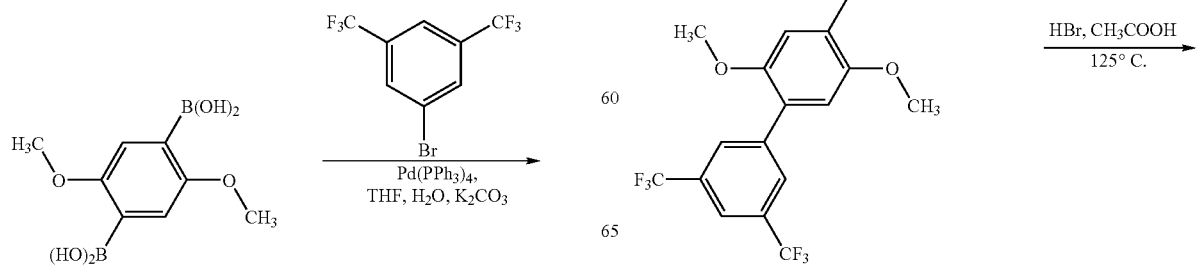

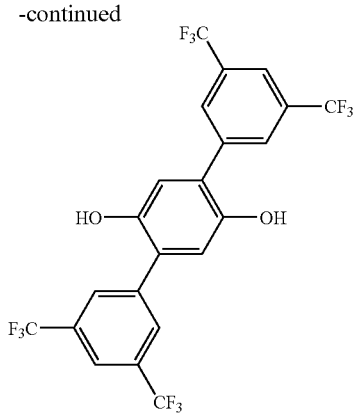

The process was performed same as in Preparation Example 4, except employing 2',5'-dimethoxy-3,5,3'',5''-tetrakis-trifluoromethyl-[1,1',4',1'']terphenyl as a starting material instead of 2',5'-dimethoxy-4,4''-bis-trifluoromethyl-[1,1'; 4',1'']terphenyl. The yield was over 93% and its mp was 176-178° C.

Figure 11:
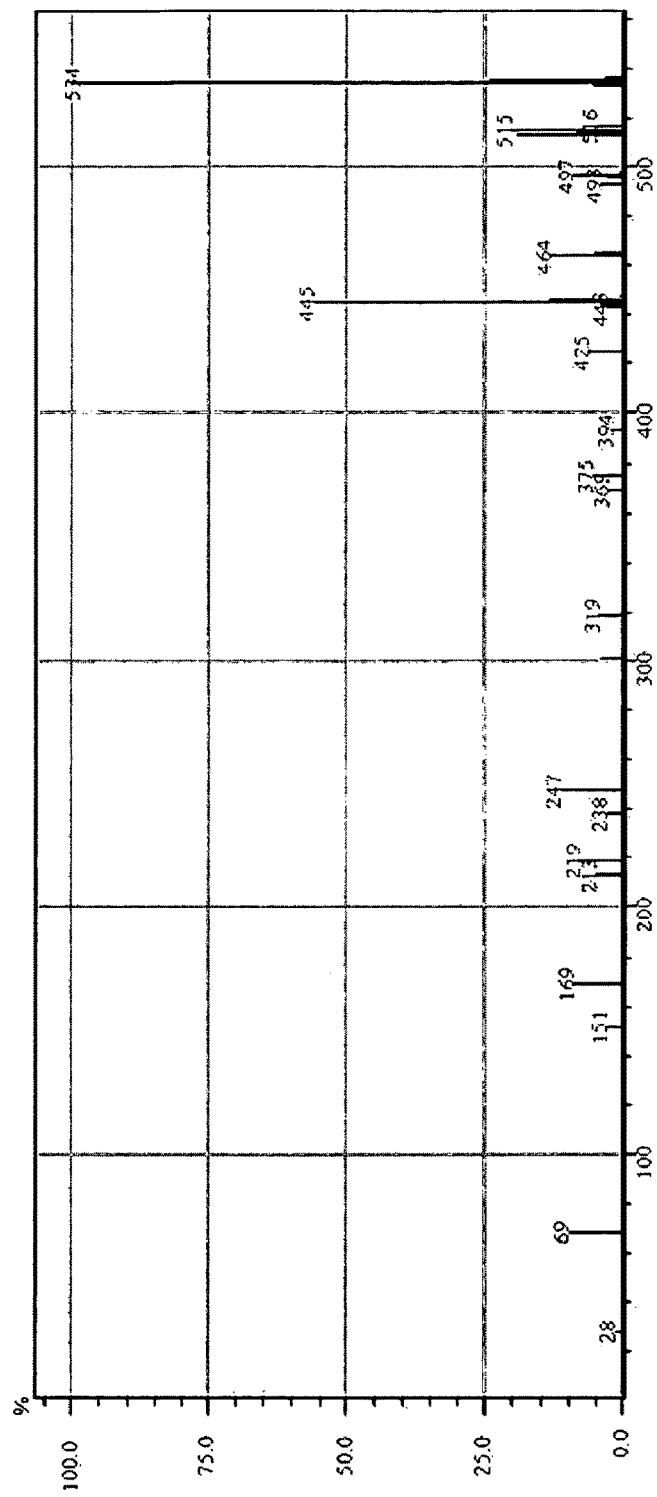
FIG. 11 is a GC-MASS spectrum of 12FTPDO.

Structure analysis was performed with GC-MASS, $^1$H-NMR, and FT-IR. As shown in GC-MASS spectrum of FIG. 11 was a very high peak for the parent ion exhibited at 534. It was identified with $^1$H-NMR spectrum of FIG. 9 that 12FTPDO was successfully formed since hydrogen peaks of the methyl group of 12FTPDO at 3.85 ppm was disappeared and a new peak corresponding to the hydroxy group at 4.77 ppm was appeared. It was further proved the formation of the desired product since the peak corresponding to the hydroxy group was shown at 3503 cm$^{-1}$ and the peak corresponding to C-H of the methyl group was disappeared in FT-IR spectrum of FIG. 10.

Preparation Example 7

Preparation of 2,3,5,6,2'',3'',5'',6''-octafluoro-2',5'-dimethoxy-4,4''-bis-trifluoromethyl-[1,1',4',1'']terphenyl (14FDMTP)

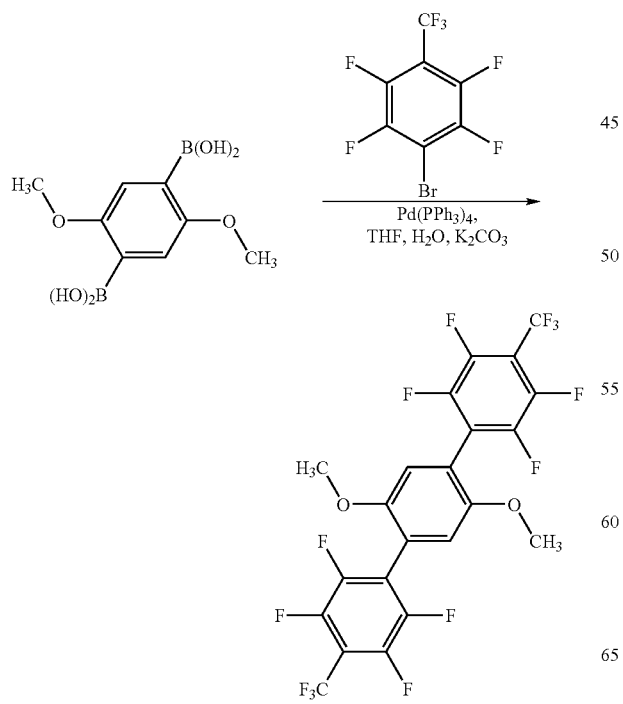

The process was performed same as in Preparation Example 3 above, except employing 1-bromo-2,3,5,6-tetrafluoro-4-(trifluoromethyl)benzene as a starting material instead of 4-bromobenzotrifluoride. The yield was over 90% and its mp was 235-239□.

Figure 3:
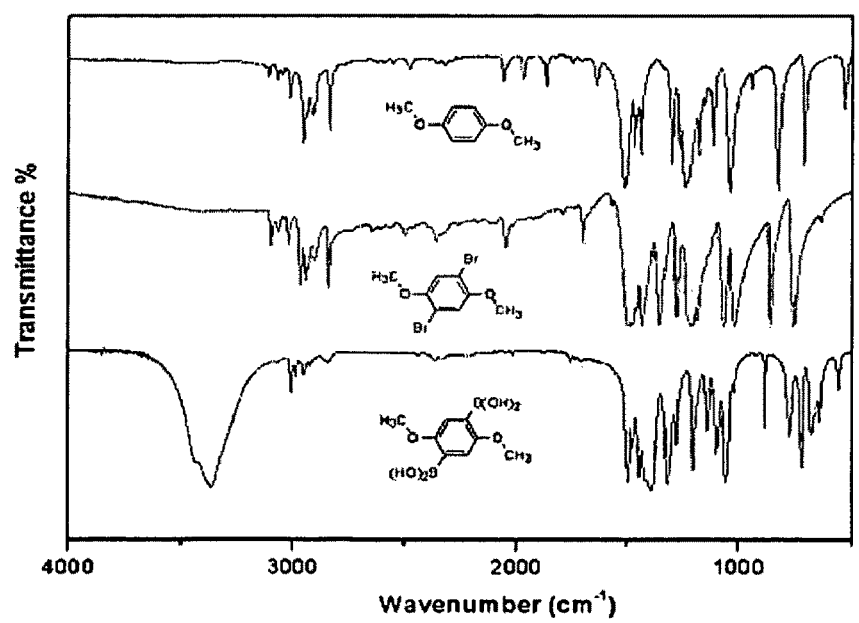
FIG. 3 is FT-IR spectra of 1,4-methoxy benzene, 1,4-dibromo-2,5-dimethoxy benzene, and 2,5-dimethoxy-1,4-benzenediboronic acid.
Figure 12:
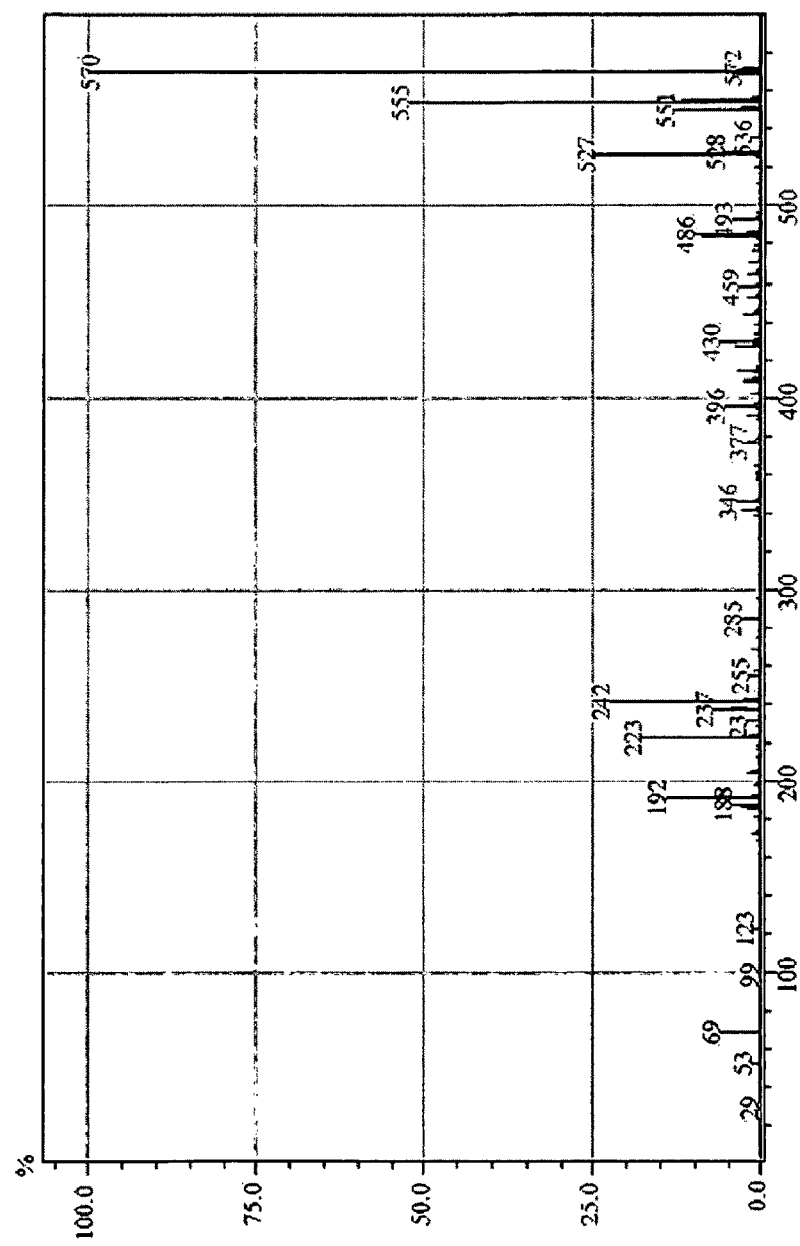
FIG. 12 is a GC-MASS spectrum of 14FDMTP.
Figure 13:
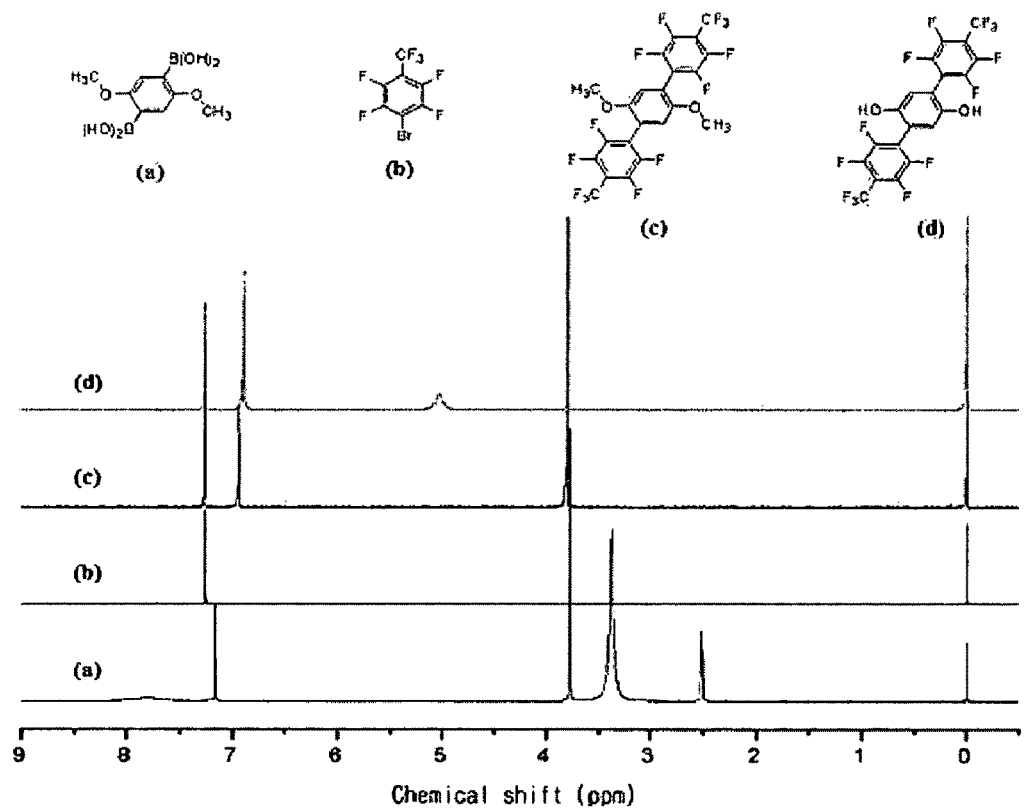
FIG. 13 is $^1$H-NMR spectra of 2,5-dimethoxy-1,4-benzenediboronic acid, 1-bromo-2,3,5,6-tetrafluoro-4-(trifluoromethyl)benzene, 14FDMTP, and 14FTPDO.
Figure 14:
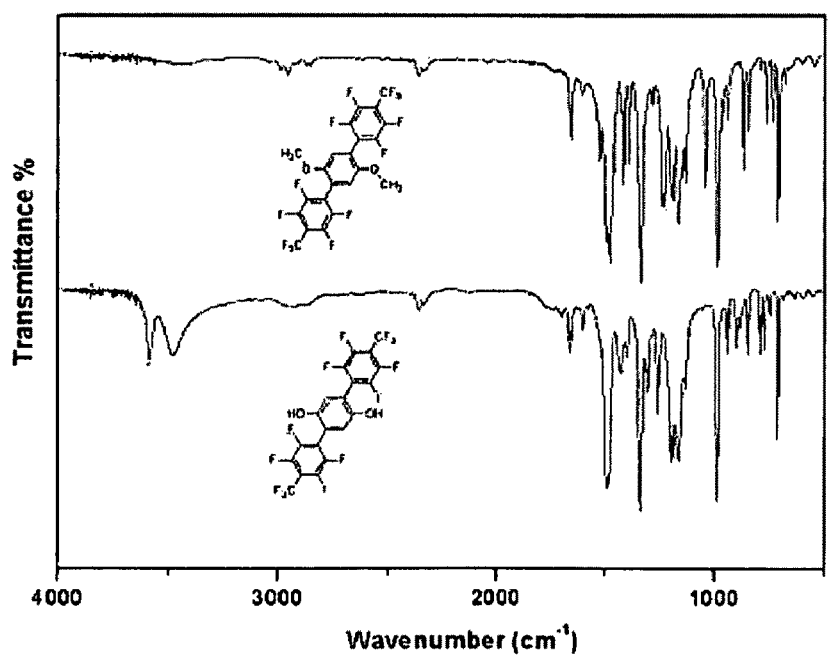
FIG. 14 is FT-IR spectra of 14FDMTP and 14FTPDO.

Structure analysis was performed with GC-MASS, $^1$H-NMR, $^{19}$F-NMR, and FT-IR. As shown in GC-MASS spectrum of FIG. 12 was a very high peak for the parent ion exhibited at 570 and a peak without one methyl group was shown at 555. It was identified with $^1$H-NMR spectrum of FIG. 13 that 12FDMTP was successfully formed since the peak for boronic acid was disappeared and new peaks corresponding to hydrogens of the methyl group of 1-bromo-2,3, 5,6-tetrafluoro-4-(trifluoromethyl)benzene were deshielded with substitution of fluorine which has greater electronegativity than hydrogen, resulting in more downfield chemical shift (higher ppm). appeared at 7.87, 8.01 ppm. It was further identified the formation of 12FDMTP in $^{19}$F-NMR spectrum since several peaks corresponding to fluorine substituted at aliphatic side were shown around −135.06 and −138.25 ppm while those corresponding to fluorine of the trifluoromethyl group substituted at aromatic side were shown around −53.51 ppm. Area ratio of each fluorine peak was precisely correspond which exhibited the formation of 12FDMTP. It was noted that the peak for the hydroxy group of boronic acid was disappeared as shown in FIGS. 3 and 14. According to the analysis described above, it was noted that Suzuki cross-coupling reaction was successfully accomplished.

Preparation Example 8

Preparation of 2,3,5,6,2'',3'',5'',6''-octafluoro-4,4''-bis-trifluoromethyl-[1,1',4',1'']terphenyl-2',5'-diol (14FTPDO)

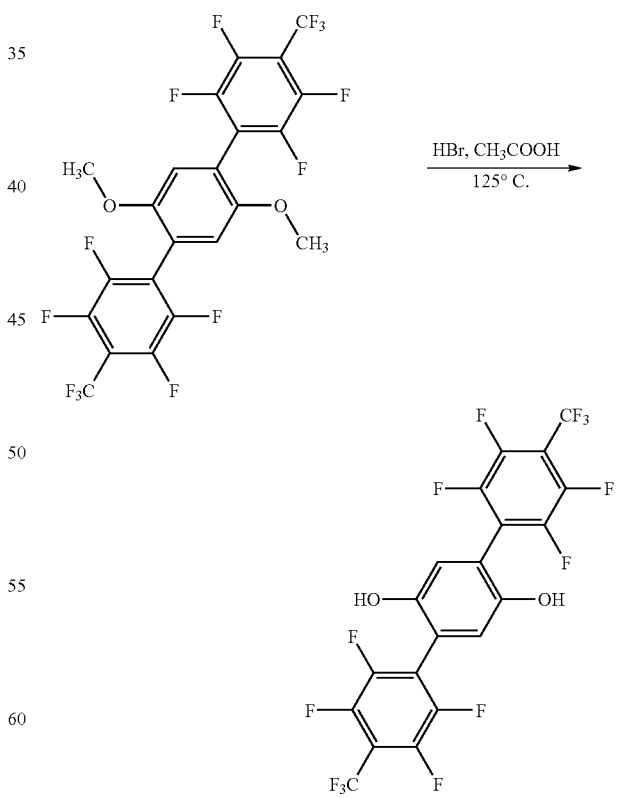

The process was performed same as in Preparation Example 4 above, except employing 2,3,5,6,2'',3'',5'',6''-octafluoro-2',5'-dimethoxy-4,4''-bis-trifluoromethyl-[1,1',4', 1'']terphenyl as a starting material instead of 2',5'-dimethoxy- 4,4"-bis-trifluoromethyl-[1,1';4',1"]terphenyl. The yield was over 95% and its mp was 218-222° C.

Figure 15:
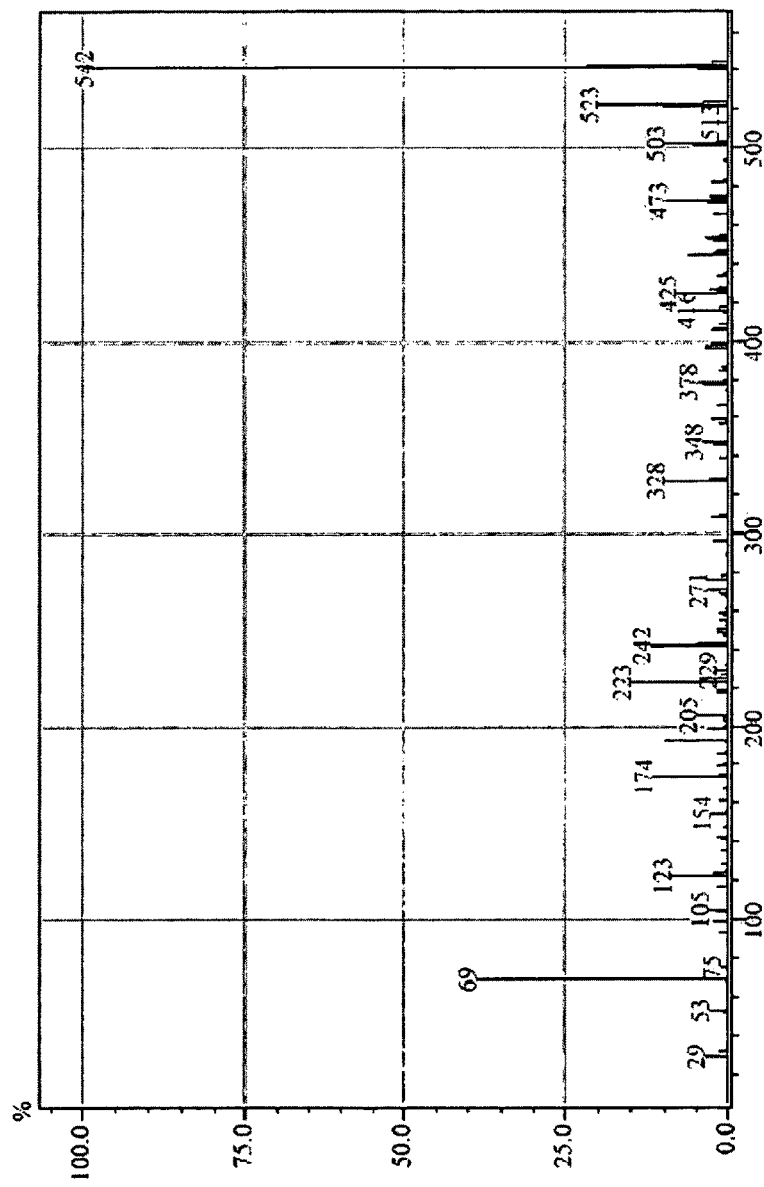
FIG. 15 is a GC-MASS spectrum of 14FTPDO.

Structure analysis was performed with GC-MASS, $^1$H-NMR, and FT-IR. As shown in GC-MASS spectrum of FIG. 15 was a very high peak for the parent ion exhibited at 542. It was identified with $^1$H-NMR spectrum of FIG. 13 that 14FTPDO was successfully formed since hydrogen peaks of the methyl group of 14FTPDO at 3.80 ppm was disappeared and a new peak corresponding to the hydroxy group at 5.04 ppm was appeared. It was further proved the formation of the desired product since the peak corresponding to the hydroxy group involved with a hydrogen bond was shown at 3482 cm$^{-1}$ and the peak without hydrogen bond 3482 cm$^{-1}$ as shown in FT-IR spectrum of FIG. 14.

EXAMPLE

Poly(Arylene Ether Sulfide) Substituted with Fluorine

Example 1

Preparation of Poly(Arylene Ether Sulfide)-TP ("FPAESI-TP") substituted with fluorine can be controlled by utilizing mole ratio of each monomer. The reaction can be performed at a temperature of from 100° C. to 168° C., preferably 120° C. The formation of FPAESI-TP was identified with $^1$H-NMR, $^{19}$F-NMR, and $^{13}$C-NMR analysis.

Figure 16:
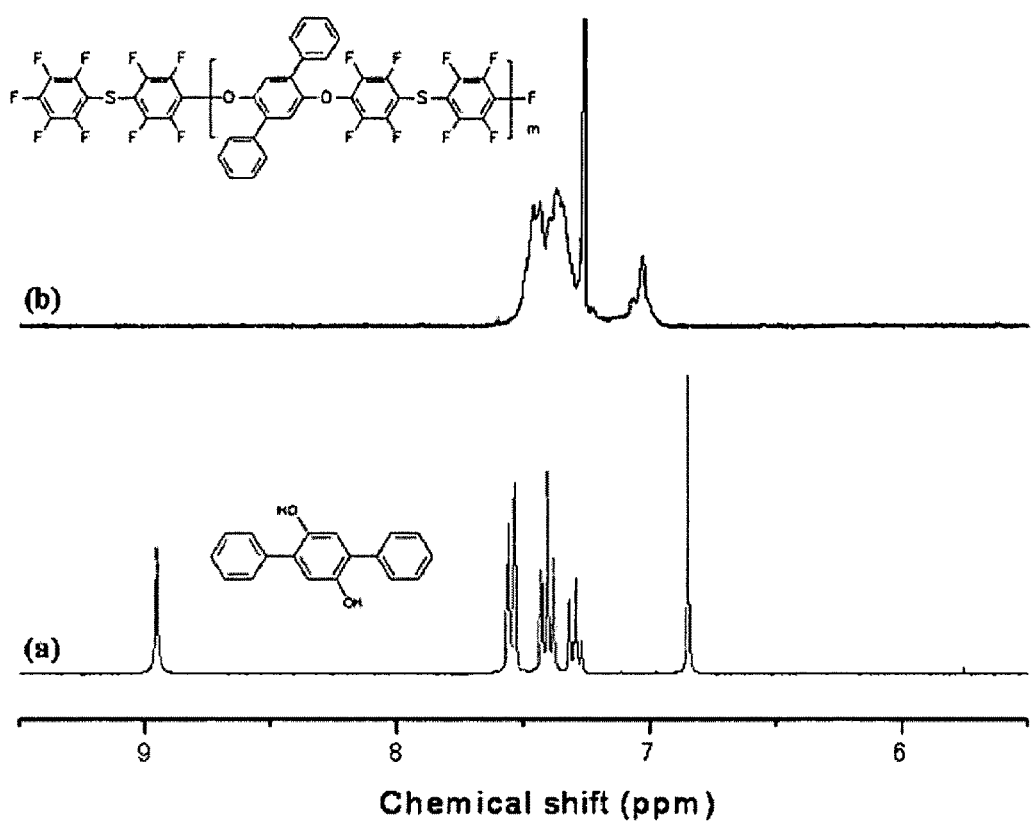
FIG. 16 is $^1$H-NMR spectra of TPDO and FPAESI-TP.

In $^1$H-NMR spectrum of FIG. 16 the formation of the polymer was identified since the hydrogen peak of the hydroxy group of terphenyl dihydroxy was disappeared and the peak corresponding to the monomer at 6.85 ppm was deshielded to 7.03 ppm due to effect of surrounding pentafluorophenyl sulfide. In addition, width of all peaks became broader which exhibited the formation of the polymer via polycondensation reaction.

Figure 17:
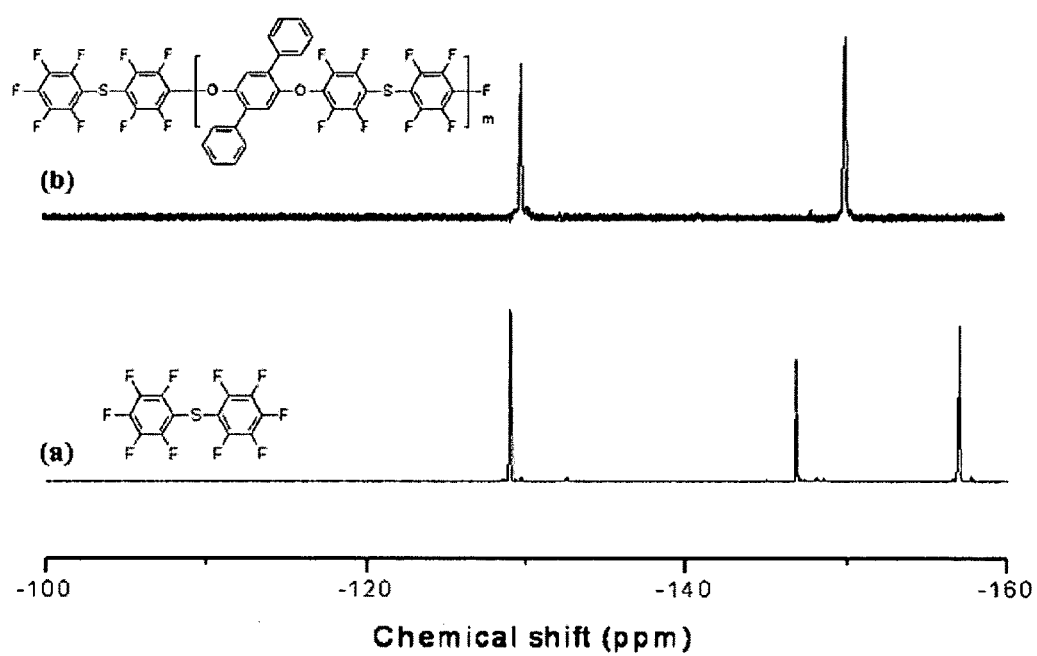
FIG. 17 is $^{19}$F-NMR spectra of pentafluorophenyl sulfide and FPAESI-TP.
Figure 18:
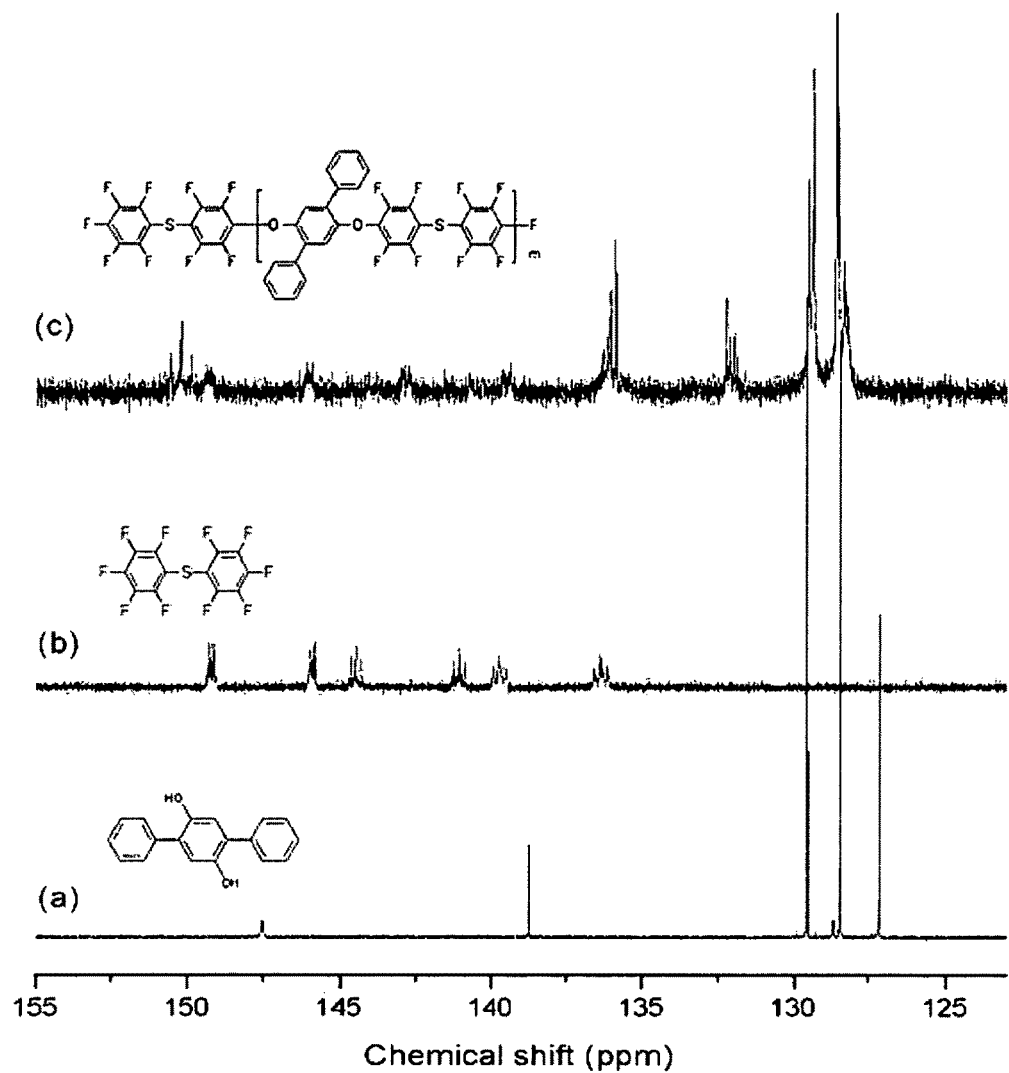
FIG. 18 is $^{13}$C-NMR spectra of TPDO, pentafluorophenyl sulfide, and FPAESI-TP.

It was noted that fluorine in para-position of the pentafluorophenyl group was involved to the polymerization since only two peaks were shown in $^{19}$F-NMR of FIG. 17. In $^{13}$C-NMR spectrum of FIG. 18 it was further noted that there were 3 peaks for para-positioned carbon (C) of the pentafluorophenyl group but after polymerization, one of those 3 peaks showed more upfield chemical shift (lower ppm) due to disappearance of fluorine effect, which proved that the polycondensation was achieved.

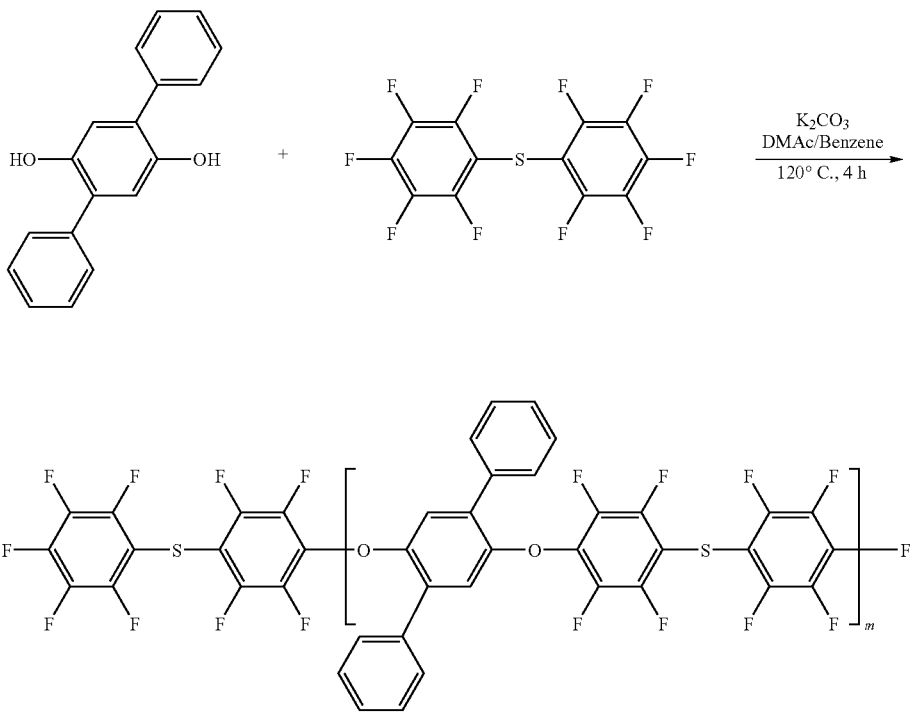

Into a 50 mL two-necked round flask equipped with stirring bar, nitrogen entrance and dean-stack trap were placed [1,1', 4',1"]terphenyl-2',5'-diol (TPDO) (1.3115 g) as terphenyl dihydroxy compound, pentafluorophenyl sulfide (1.8492 g) as sulfide compound, K$_2$CO$_3$ (0.7947 g), DMAc (15 mL), and benzene (10 mL). After the reaction mixture was heated to 120° C. and reacted for 4 hours, it was precipitated from methanol/water (1:1, v/v). The precipitated polymer was washed several times with ion exchange water and then vacuum-dried for 3 days. Molecular weight of the polymer Since molecular weight of polymer has a strong link with its refractive index and physical property, it is great advantage to control the molecular weigh during the formation of polymer. Molecular weight was determined with THF solvent based on polystyrene standard.

The following Table 1 shows molecular weight according to mole ratio of the monomer during the preparation of FPAESI-TP. Molecular weight (M$_n$) of FPAESI-TP was in the range of 11,625 to 25,712 and the degree of dispersion was in the range of 2.04 to 3.17. Yield was 93-96%.

TABLE 1

| FPAESI-TP | Mole ratio[a] of monomer | $M_n$ theoretical[b] | $M_n$ obtained[c] | $M_w$[d] | Degree of dispersion | Tg (° C.) | Yield (%) |
|---|---|---|---|---|---|---|---|
| FPAESI-TP1 | 0.9390 | 10,174 | 11,625 | 36,910 | 3.17 | 138 | 95 |
| FPAESI-TP2 | 0.9600 | 15,077 | 16,055 | 51,071 | 3.18 | 173 | 96 |
| FPAESI-TP3 | 0.9701 | 20,047 | 21,725 | 47,993 | 2.21 | 177 | 95 |
| FPAESI-TP4 | 0.9762 | 25,092 | 25,712 | 52,354 | 2.04 | 178 | 93 |

Figure 19:
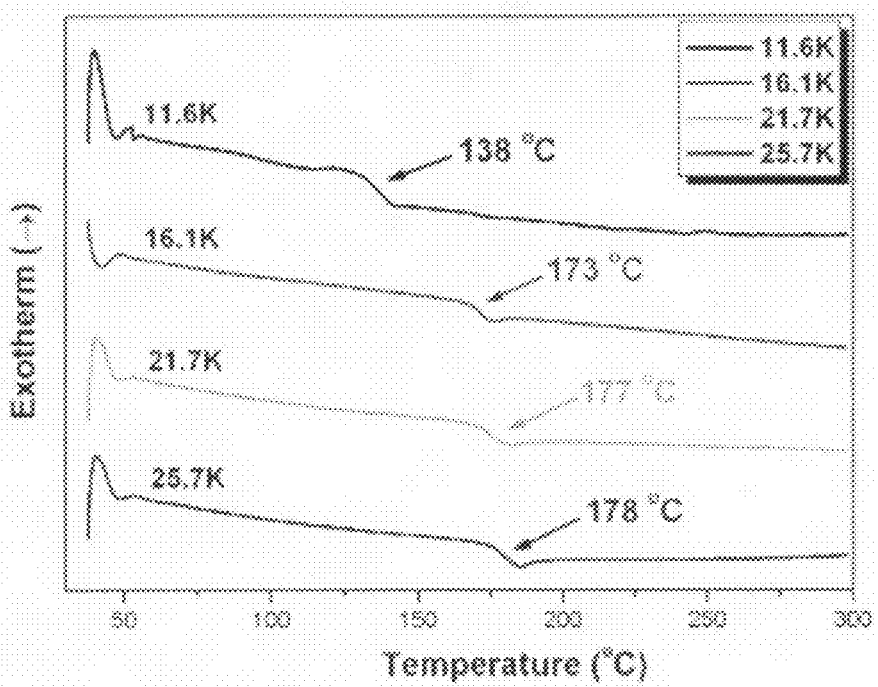
FIG. 19 is a graph illustrating Glass transition temperature of FPAESI-TPs according to molecular weight.

[a]mole ratio of monomer (TPDO/pentafluorophenyl sulfide (mol/mol))
[b]theoretical number-average molecular weight
[c]obtained number-average molecular weight
[d]obtained weight-average molecular weight Glass transition temperature (Tg) of the FPAESI-TP polymer was determined by differential scanning calorimeter (DSC) under $N_2$ at a controlled heating rate of 10° C./min. FIG. 19 illustrates changes in glass transition temperature according to molecular weight of FPAESI-TP. When molecular weight of FPAESI-TP increased from 11,625 to 25,712, the corresponding glass transition temperature increased from 138° C. to 178° C.

Figure 20:
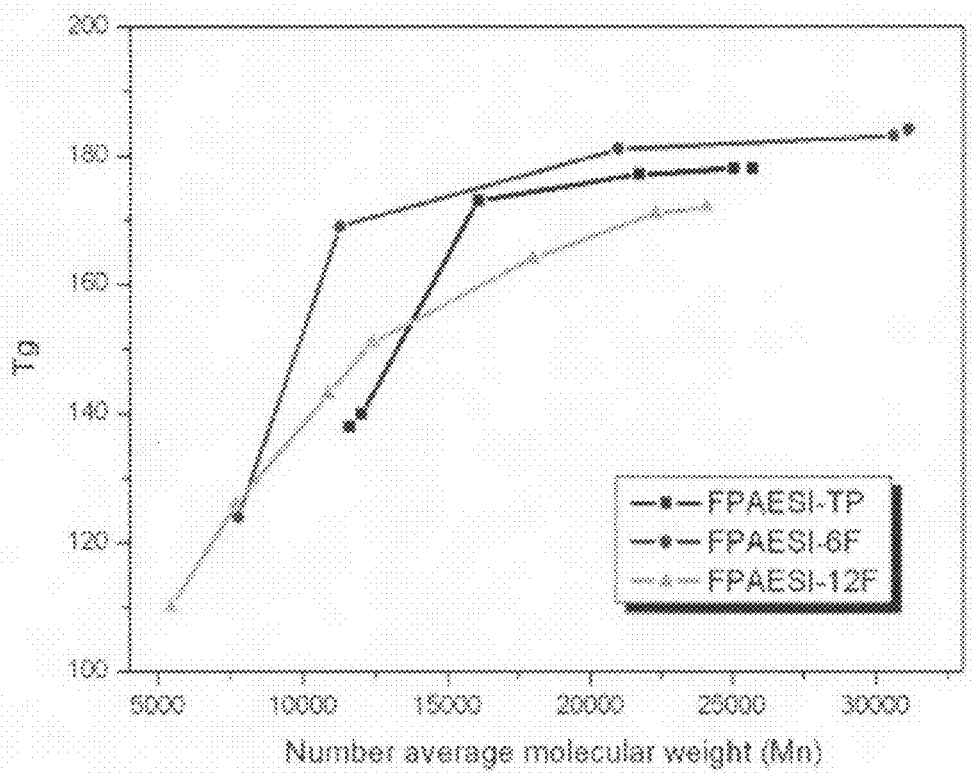
FIG. 20 is a graph illustrating Glass transition temperature of FPAESI-TPs, FPAESI-6Fs, and FPAESI-12Fs according to molecular weight.

Further, FIG. 20 illustrates changes in glass transition temperature according to molecular weight of FPAESI-TP. It was noted that the graph was similar to that for the physical property of polymer that is dependent on the number of groups at the chain end, free volume of the chain end, and internal interaction of the polymer. There were typical thermophysical properties.

Figure 21:
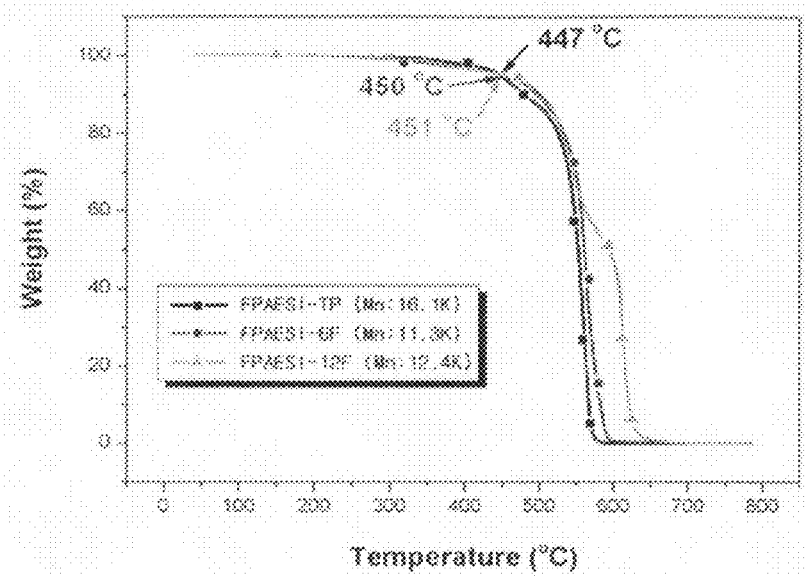
FIG. 21 is a graph illustrating Thermogravimetric analysis (TGA) of FPAESI-TP, FPAESI-6F, and FPAESI-12F.

FIG. 21 shows pyrolysis temperature (Td) according to molecular weight which was determined under atmosphere with a controlling heating rate of 10° C./min. The pyrolysis temperature corresponding to a molecular weight of 16,055 was 447° C.

Example 2

Preparation of Poly(Arylene Ether Sulfide)-6F (FPAESI-6F) substituted with fluorine

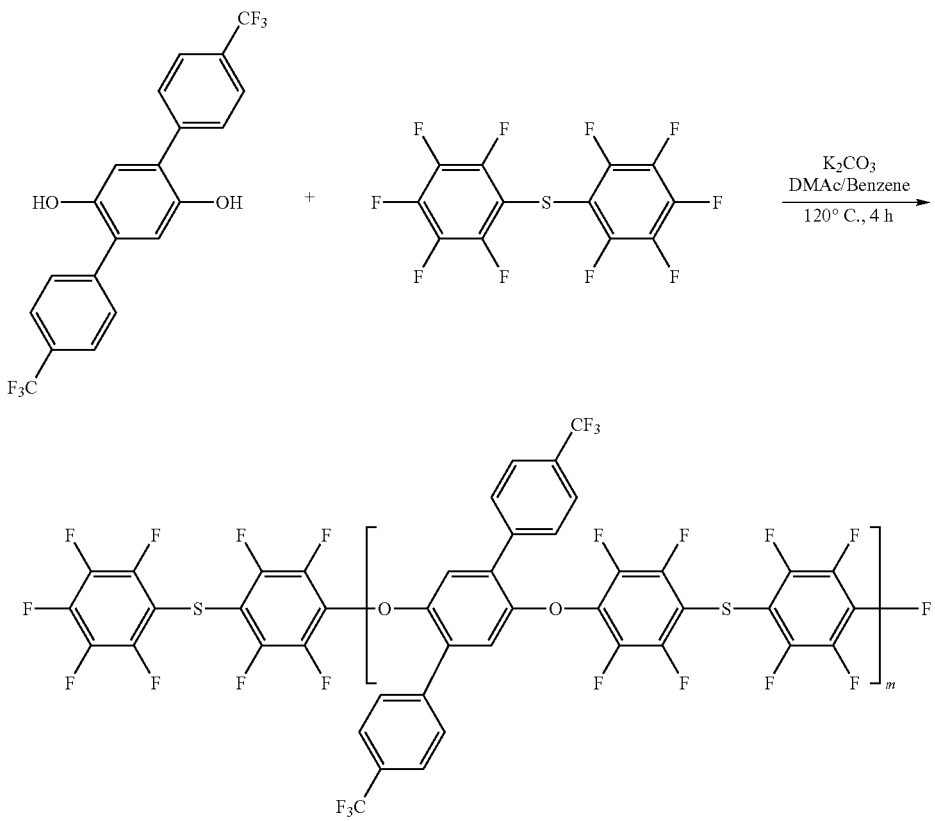

The process was performed by the same procedure of Example 1, except employing 4,4″-bis-trifluoromethyl-[1,1′,4′,1″]terphenyl-2′,5′-diol (6FTPDO) as a terphenyl dihydroxy compound. The structure of FPAESI-6F was identified with $^1$H-NMR, $^{19}$F-NMR, and $^{13}$C-NMR.

Figure 22:
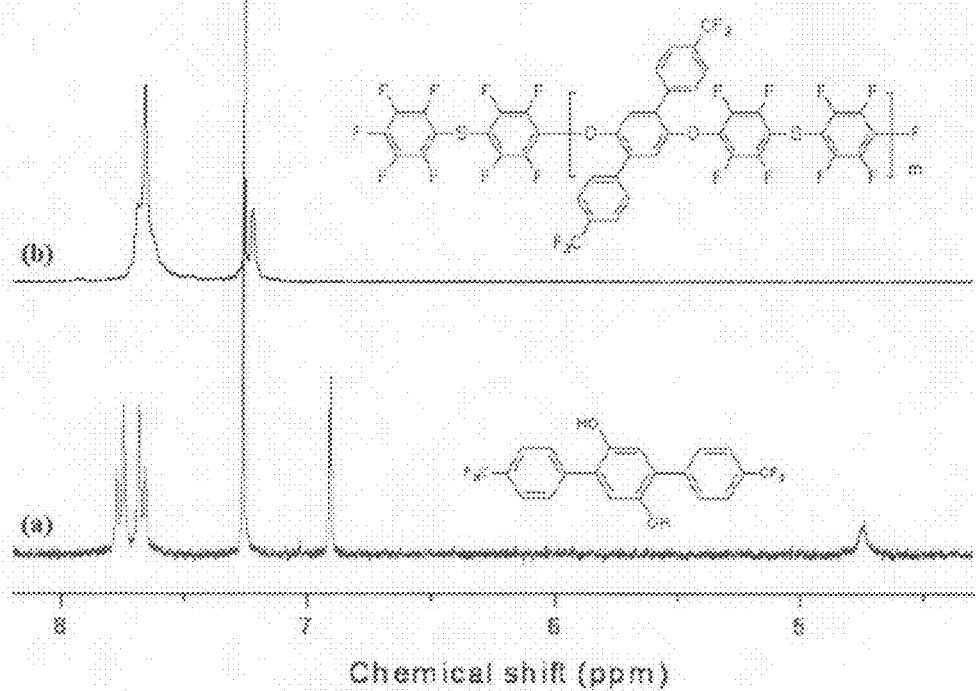
FIG. 22 is $^1$H-NMR spectra of 6FTPDO and FPAESI-6F.

According to $^1$H-NMR spectrum of FIG. 22, the formation of the polymer was identified since the hydrogen peak of the hydroxy group of terphenyl dihydroxy monomer was disappeared and the peak corresponding to the monomer at 6.91 ppm was deshielded to 7.23 ppm due to effect of surrounding pentafluorophenyl sulfide. In addition, width of all peaks became widen which exhibited the formation of the polymer via polycondensation reaction.

Figure 23:
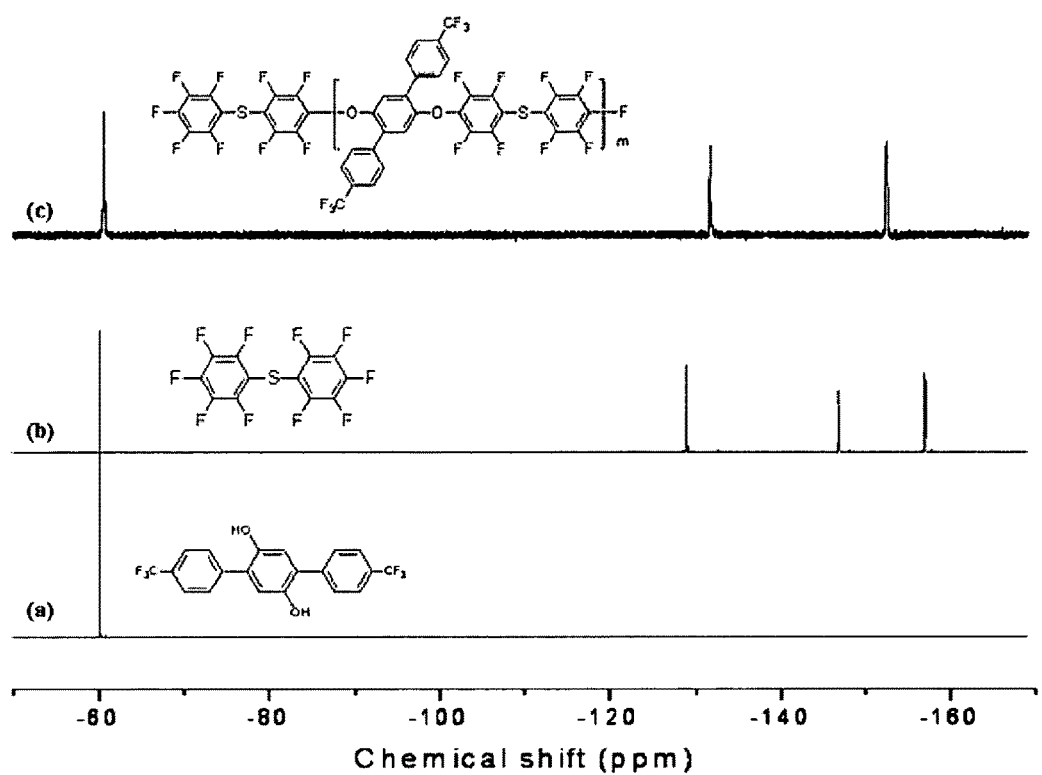
FIG. 23 is $^{19}$F-NMR spectra of 6FTPDO, pentafluorophenyl sulfide, and FPAESI-6F.

It was noted that fluorine in para-position of the pentafluorophenyl group was involved to the polymerization since the peak corresponding to para-F was disappeared in $^{19}$F-NMR of FIG. 23.

Figure 24:
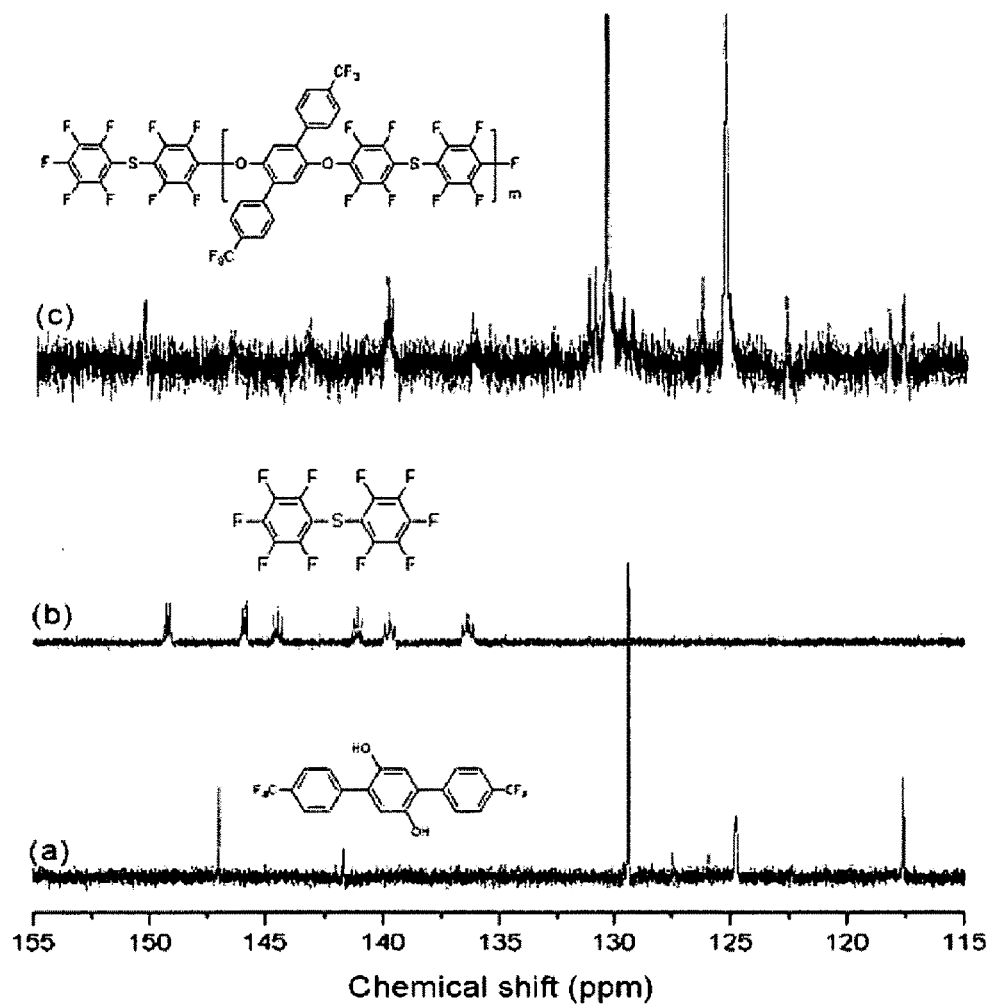
FIG. 24 is $^{13}$C-NMR spectra of 6FTPDO, pentafluorophenyl sulfide, and FPAESI-6F.

In $^{13}$C-NMR spectrum of FIG. 24 it was further noted that there were 3 peaks for para-positioned carbon (C) of the pentafluorophenyl group but after polymerization, one of those 3 peaks showed more upfield chemical shift (lower ppm) due to disappearance of fluorine effect, which proved that the polycondensation was achieved.

The following Table 2 shows molecular weight changes according to mole ratio of the monomer during the preparation of FPAESI-6F. Molecular weight ($M_n$) of FPAESI-6F was in the range of 7,773 to 30,604 and the degree of dispersion was in the range of 2.15 to 3.09. Yield was 91-96%.

TABLE 2

| FPAESI-6F | Mole ratio$^a$ of monomer | $M_n$ theoretical$^b$ | $M_n$ obtained$^c$ | $M_w^d$ | Degree of dispersion | Tg (° C.) | Yield (%) |
|---|---|---|---|---|---|---|---|
| FPAESI-6F1 | 0.8450 | 5,040 | 7,773 | 19,662 | 2.53 | 124 | 93 |
| FPAESI-6F2 | 0.9250 | 10,025 | 11,274 | 29,925 | 2.65 | 169 | 91 |
| FPAESI-6F3 | 0.9632 | 20,053 | 20,991 | 64,992 | 3.09 | 181 | 96 |
| FPAESI-6F4 | 0.9756 | 30,057 | 30,604 | 65,717 | 2.15 | 183 | 95 |

Figure 25:
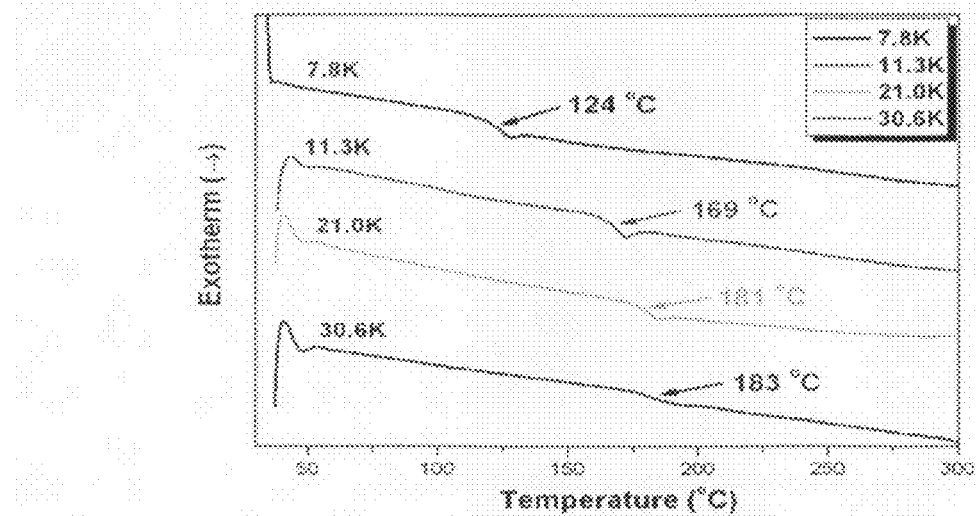
FIG. 25 is a graph illustrating Glass transition temperature of FPAESI-6Fs according to molecular weight.

$^a$mole ratio of monomer (TPDO/pentafluorophenyl sulfide (mol/mol))
$^b$theoretical number-average molecular weight
$^c$obtained number-average molecular weight
$^d$obtained weight-average molecular weight Glass transition temperature (Tg) of the FPAESI-6F polymer was determined by differential scanning calorimeter (DSC) under $N_2$ at a controlled heating rate of 10° C./min. FIG. 25 illustrates changes in glass transition temperature according to molecular weight of FPAESI-6F. When molecular weight of FPAESI-6F increased from 7,773 to 30,604, the corresponding glass transition temperature increased from 124° C. to 183° C.

Further, FIGS. 20 and 21 illustrate changes in glass transition temperature and thermogravimetry according to molecular weight of FPAESI-6F. It was noted that changes in glass transition temperature according to molecular weight of FPAESI-6F was similar to typical thermophysical properties as shown for those in Example 1. The pyrolysis temperature corresponding to a molecular weight of 11,274 was 450° C.

Example 3

Preparation of Ppoly(Arylene Ether Sulfide)-12F (FPAESI-12F) substituted with fluorine

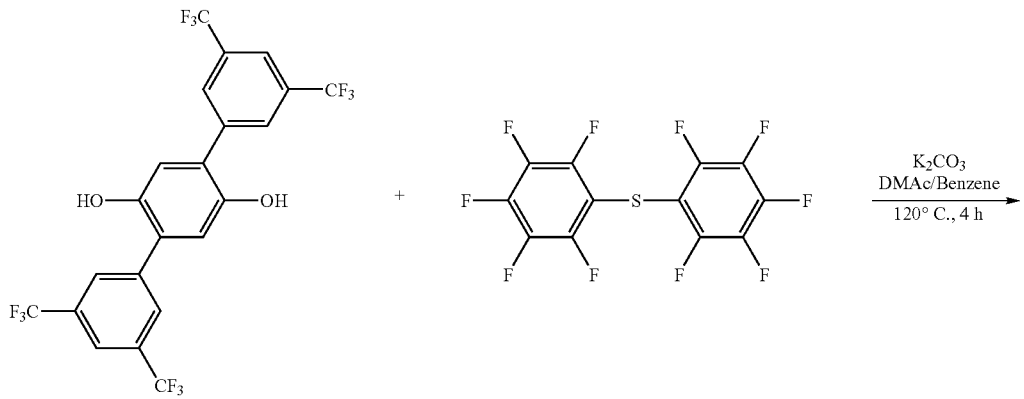

-continued

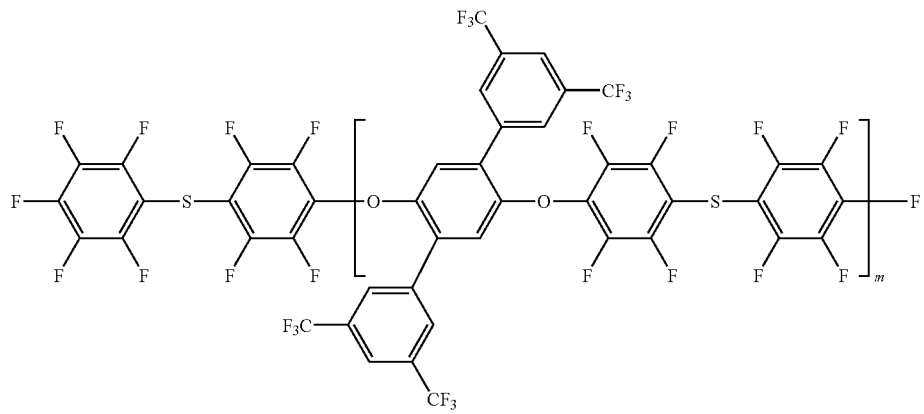

The process was performed by the same procedure of Example 1 to obtain FPAESI-12F polymer, except employing 3,5,3",5"-tetrakis-trifluoromethyl-[1,1',4',1"]terphenyl-2',5'-diol (12FTPDO) as a terphenyl dihydroxy compound. The structure of FPAESI-12F was identified with $^1$H-NMR, $^{19}$F-NMR, and $^{13}$C-NMR.

Figure 26:
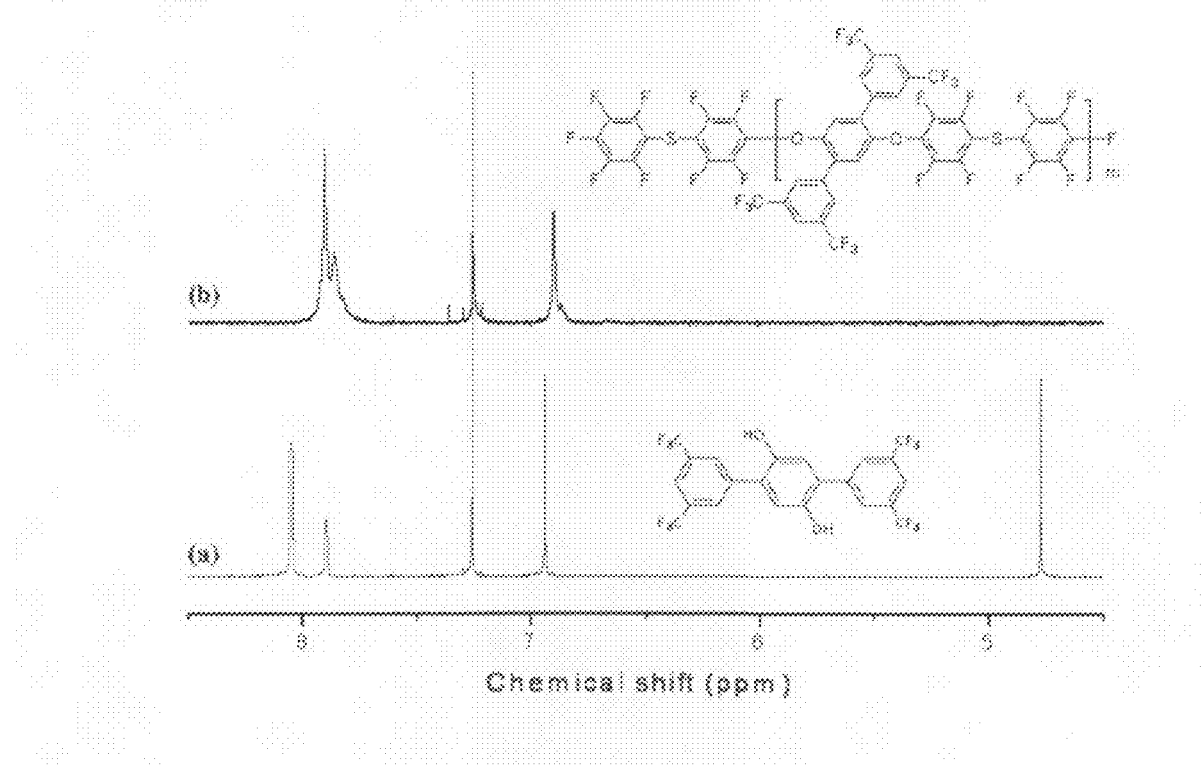
FIG. 26 is $^1$H-NMR spectra of 12FTPDO and FPAESI-12F.

According to $^1$H-NMR spectrum of FIG. 26, although the peak for the hydroxy group of the dihydroxy monomer was disappeared, the peak corresponding to the monomer at 6.94 ppm was not affected from pentafluorophenyl sulfide monomer since dihydroxy monomer used in the polymerization of FPAESI-12F already contains four of —CF$_3$ groups which has very strong electronegativity. However, width of all peaks became widen which exhibited the formation of the polymer via polycondensation reaction.

Figure 27:
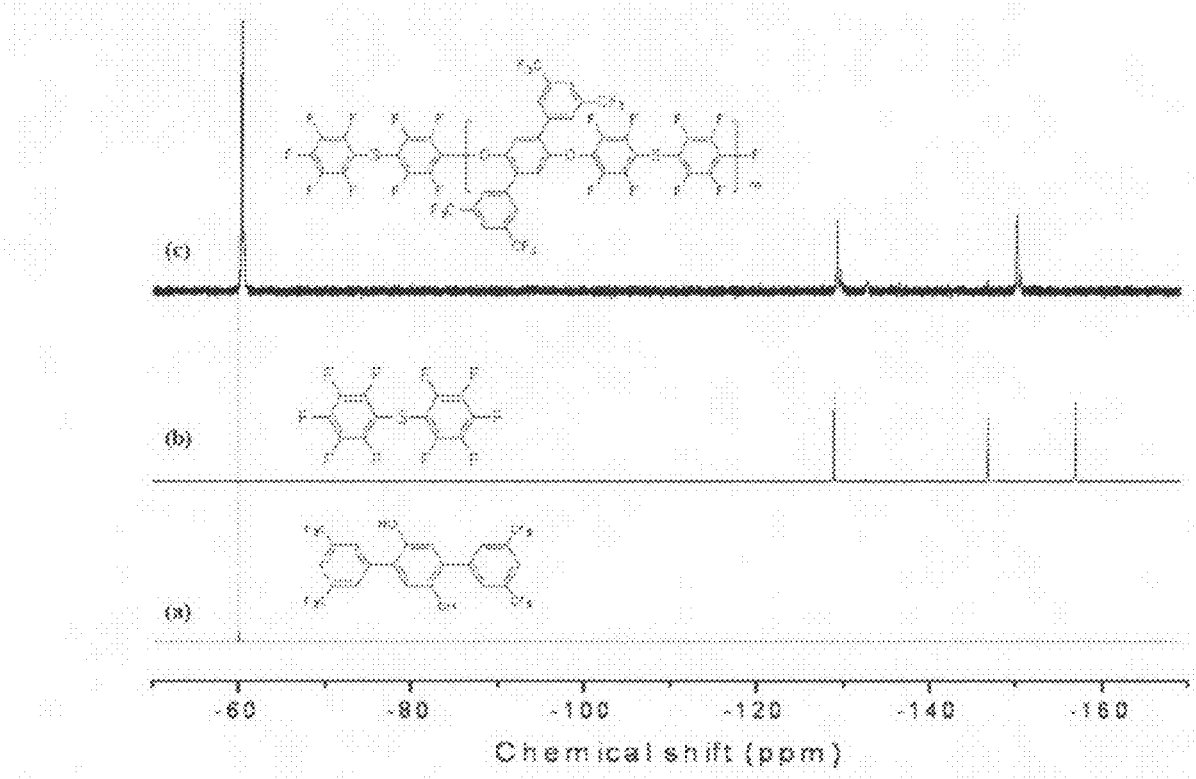
FIG. 27 is $^{19}$F-NMR spectra of 12FTPDO, pentafluorophenyl sulfide, and FPAESI-12F.

It was noted that fluorine in para-position of the pentafluorophenyl group was involved to the polymerization since the peak corresponding to para-F was disappeared as shown in $^{19}$F-NMR of FIG. 27.

Figure 28:
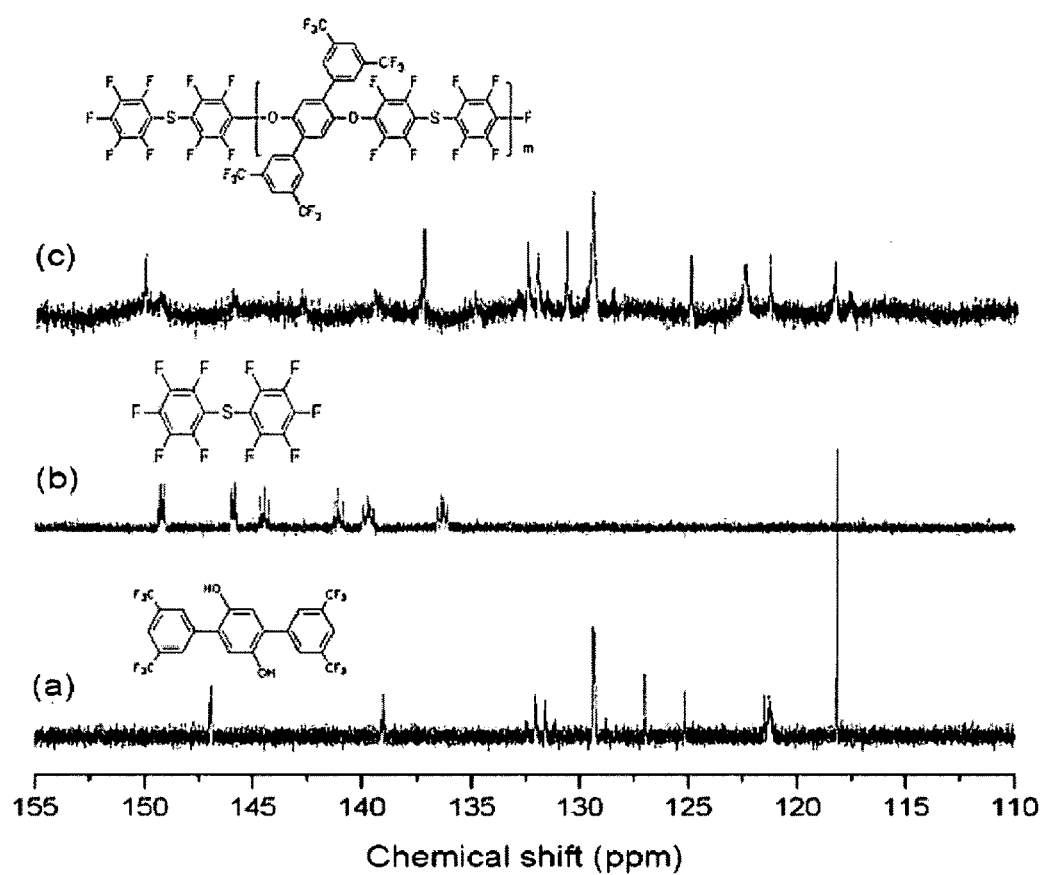
FIG. 28 is $^{13}$C-NMR spectra of 12FTPDO, pentafluorophenyl sulfide, and FPAESI-12F.

In $^{13}$C-NMR spectrum of FIG. 28 it was further noted that there were 3 peaks for para-positioned carbon (C) of the pentafluorophenyl group but after polymerization, one of those 3 peaks showed more upfield chemical shift (lower ppm) due to disappearance of fluorine effect, which proved that the polycondensation was achieved.

The following Table 3 shows molecular weight changes according to mole ratio of the monomer during the preparation of FPAESI-12F. Molecular weight ($M_n$) of FPAESI-12F was in the range of 5,434 to 24,082 and the degree of dispersion was in the range of 1.54 to 7.87. Yield was 90-95%.

TABLE 3

| FPAESI-12F | Mole ratio[a] of monomer | $M_n$ theoretical[b] | $M_n$ obtained[c] | $M_w$[d] | Degree of dispersion | Tg (° C.) | Yield (%) |
|---|---|---|---|---|---|---|---|
| FPAESI-12F1 | 0.8144 | 5,002 | 5,434 | 42,751 | 7.87 | 110 | 93 |
| FPAESI-12F2 | 0.9107 | 10,002 | 10,871 | 21,179 | 1.94 | 143 | 92 |
| FPAESI-12F3 | 0.9261 | 12,010 | 12,373 | 18,952 | 1.53 | 151 | 90 |
| FPAESI-12F4 | 0.9413 | 15,025 | 17,977 | 64,707 | 3.60 | 164 | 95 |
| FPAESI-12F5 | 0.9651 | 25,021 | 24,082 | 60,168 | 2.50 | 172 | 91 |

[a]mole ratio of monomer (TPDO/pentafluorophenyl sulfide (mol/mol))
[b]theoretical number-average molecular weight
[c]obtained number-average molecular weight
[d]obtained weight-average molecular weight Glass transition temperature (Tg) of the FPAESI-12F polymer was determined by differential scanning calorimeter (DSC) under N$_2$ at a controlled heating rate of 10° C./min. FIG. 29 illustrates changes in glass transition temperature according to molecular weight of FPAESI-12F. When molecular weight of FPAESI-12F increased from 5,434 to 24,082, the corresponding glass transition temperature increased from 110° C. to 172° C.

Further, FIGS. 20 and 21 illustrate changes in glass transition temperature and thermogravimetry according to molecular weight of FPAESI-12F. It was noted that changes in glass transition temperature according to molecular weight of FPAESI-12F was similar to typical thermophysical properties as shown for those in Example 1. The pyrolysis temperature corresponding to a molecular weight of 12,373 was 451° C.

Example 4

End Capping and Preparation of Poly(Arylene Ether Sulfide)-TP, 6F and 12F Substituted with Fluorine ("E-FPAESI-TP", "E-FPAESI-6F" and "E-FPAESI-12F")

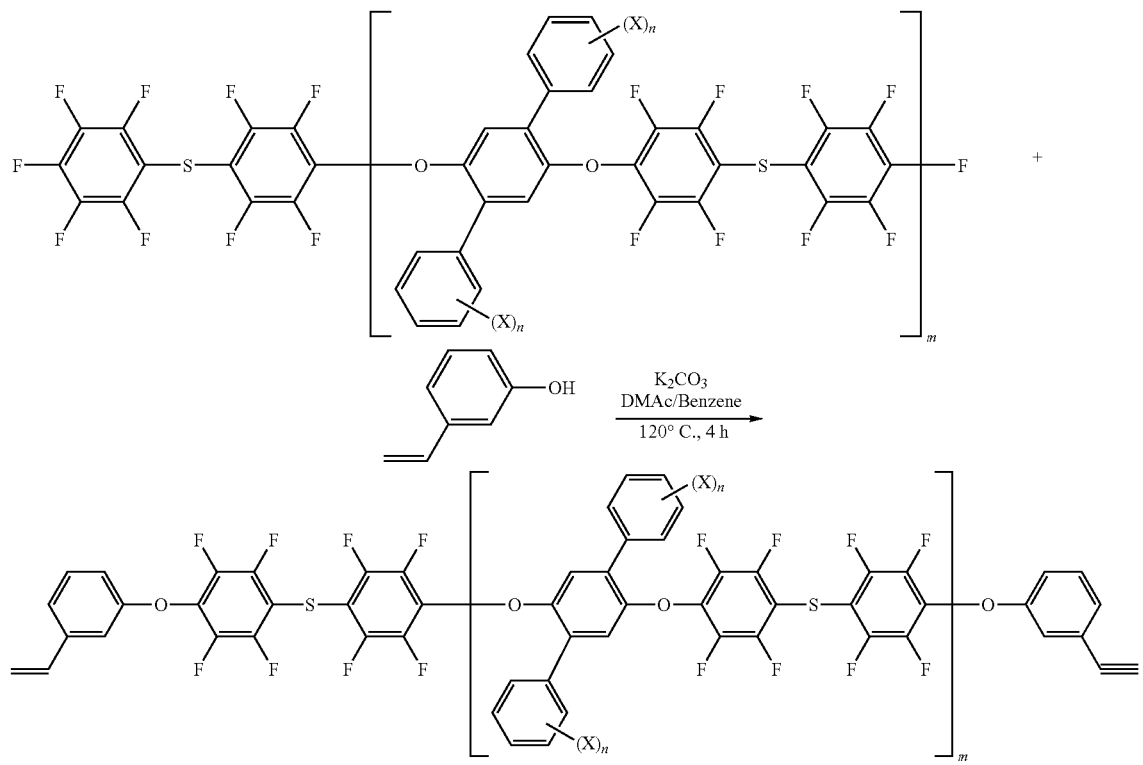

Each chain end of FPAESI-TP, FPAESI-6F and FPAESI-12F prepared in Examples 1 to 3 was introduced with 3-ethynylphenol (EP) to produce E-FPAESI-TP, E-FPAESI-6F and E-FPAESI-12F, respectively.

Into each polymer prepared in Examples 1 to 3 were 3 mole ratio of 3-ethynylphenol (EP) based on the molecular weight of the corresponding polymer and 1.5 times of $K_2CO_3$ based on the added 3-ethynylphenol was added. The reaction mixture was reacted for 3 hours and precipitated from 400 mL of methanol/water (1:1, v/v). The precipitated polymer was washed several times with ion exchange water and then vacuum-dried for 3 days. The respective structure of E-FPAESI-TP, E-FPAESI-6F and E-FPAESI-12F was identified with $^1$H-NMR, $^{19}$F-NMR, and $^{13}$C-NMR.

Figure 31:
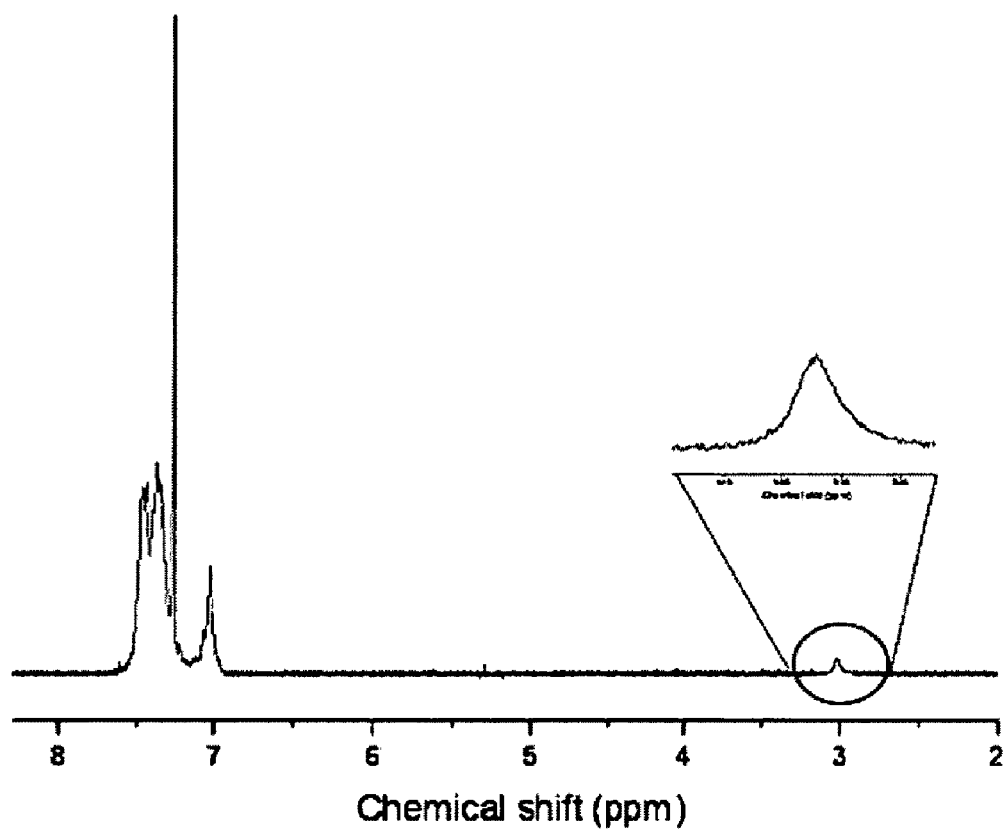
FIG. 31 is a $^1$H-NMR spectrum of E-FPAESI-TP.
Figure 32:
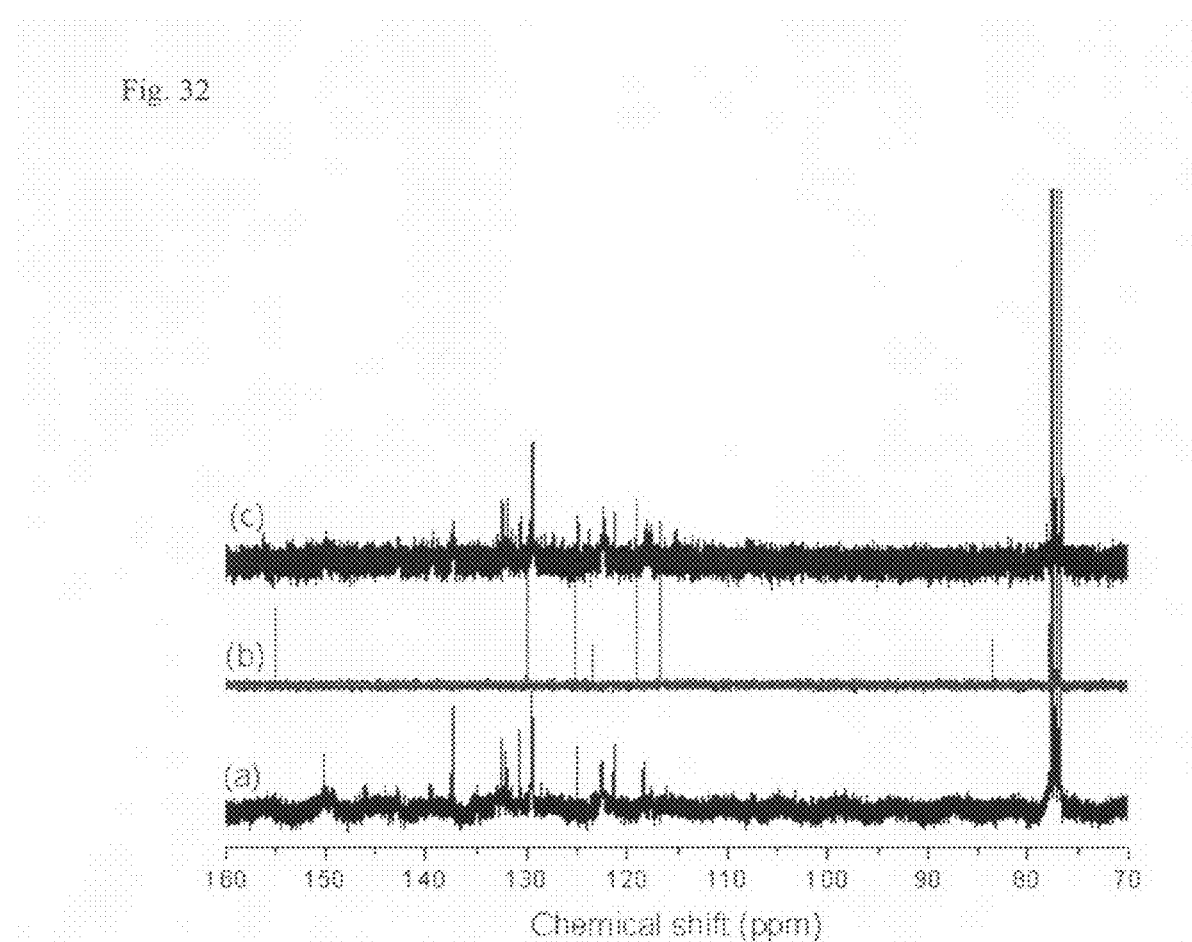
FIG. 32 is $^{13}$C-NMR spectra of 3-ethynylphenol, FPAESI-12F, and E-FPAESI-12F.
Figure 33:
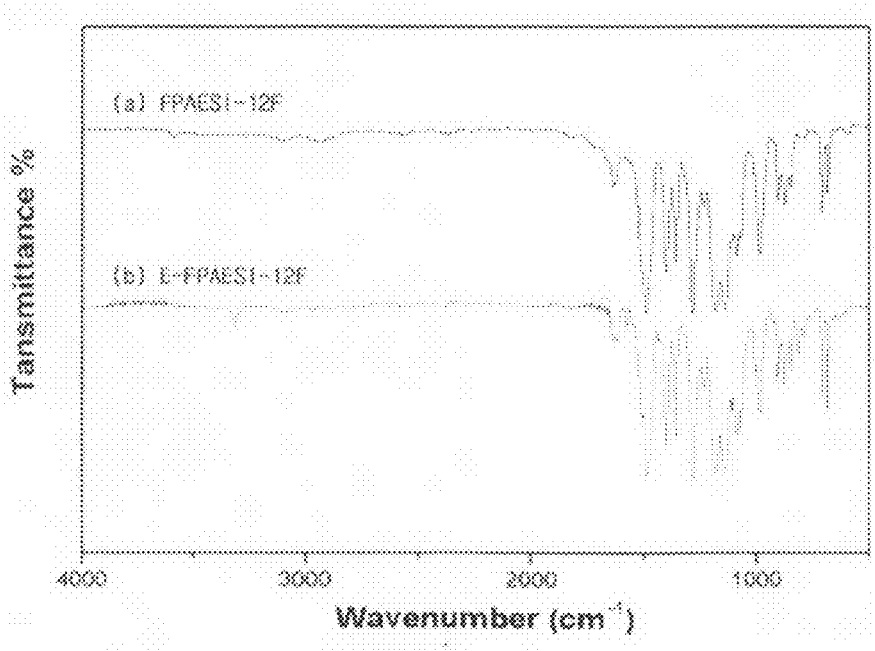
FIG. 33 is FT-IR spectra of FPAESI-12F and E-FPAESI-12F.

FIG. 30 is a $^1$H-NMR spectra of 3-ethynylphenol and FIG. 31 is a $^1$H-NMR spectra of poly(arylene ether sulfide) bonded with 3-ethynylphenol. According to FIG. 31, a singlet was shown at around 3.1 ppm for FPAESIs bonded with EP which proved EP was bonded at the end of the polymer chain. Further, in FT-IR spectrum of FIG. 33 it was identified that the reaction was successfully achieved since the peak corresponding to the ethynyl group was appeared.

The following Table 4 shows molecular weight changes according to mole ratio of the monomer during the preparation of E-FPAESI-TP, E-FPAESI-6F and E-FPAESI-12F. Molecular weight ($M_n$) of E-FPAESIs was in the range of 7,707 to 31,128 and the degree of dispersion was in the range of 1.71 to 2.89. Yield was 93-97%.

TABLE 4

| Polymer | Mole ratio[a] of monomer | $M_n$ theoretical[b] | $M_n$ obtained[c] | $M_w$[d] | Degree of dispersion | Tg (°C.) | Yield (%) |
|---|---|---|---|---|---|---|---|
| E-FPAESI-TP1 | 0.9480 | 11,683 | 12,018 | 31,127 | 2.59 | e | 93 |
| E-FPAESI-TP2 | 0.9762 | 25,092 | 25,067 | 43,824 | 1.75 | 178[h] | 92 |
| E-FPAESI-6F | 0.9756 | 30,057 | 31,128 | 85,050 | 2.73 | f | 90 |

TABLE 4-continued

| Polymer | Mole ratio[a] of monomer | M$_n$ theoretical[b] | M$_n$ obtained[c] | M$_w$[d] | Degree of dispersion | Tg (° C.) | Yield (%) |
|---|---|---|---|---|---|---|---|
| E-FPAESI-12F1 | 0.8144 | 5,002 | 7,707 | 13,147 | 1.71 | 126[i] | 95 |
| E-FPAESI-12F2 | 0.9562 | 20,011 | 22,293 | 64,371 | 2.89 | g | 91 |

Figure 34:
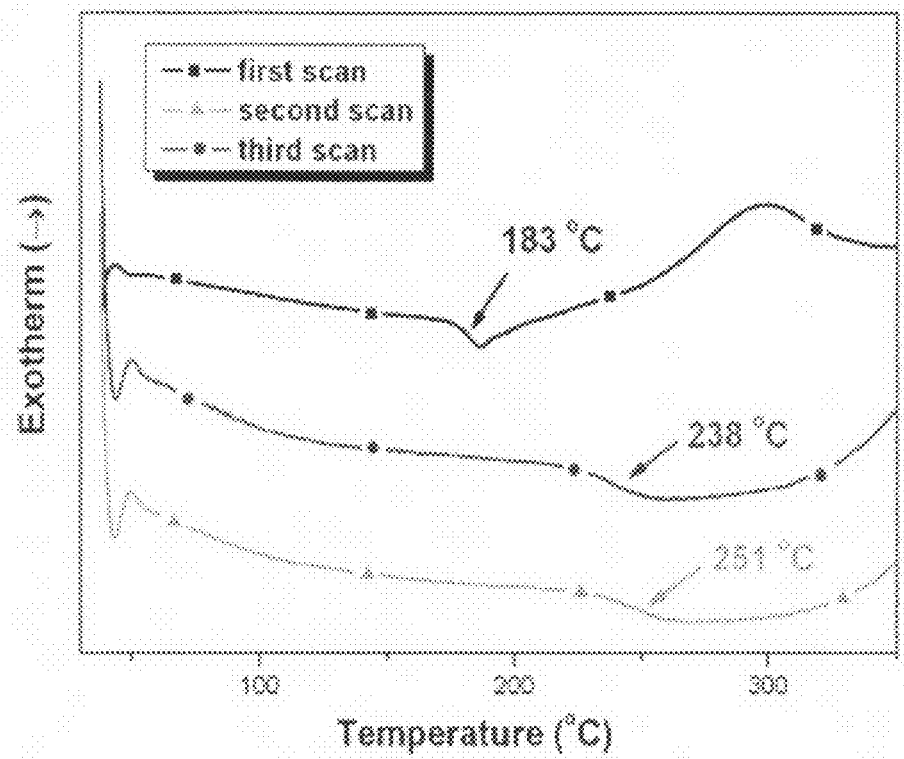
FIG. 34 is a graph illustrating Glass transition temperature of E-FPAESI-TP ($M_n$=12.0K) according to the number of thermal treatment.
Figure 35:
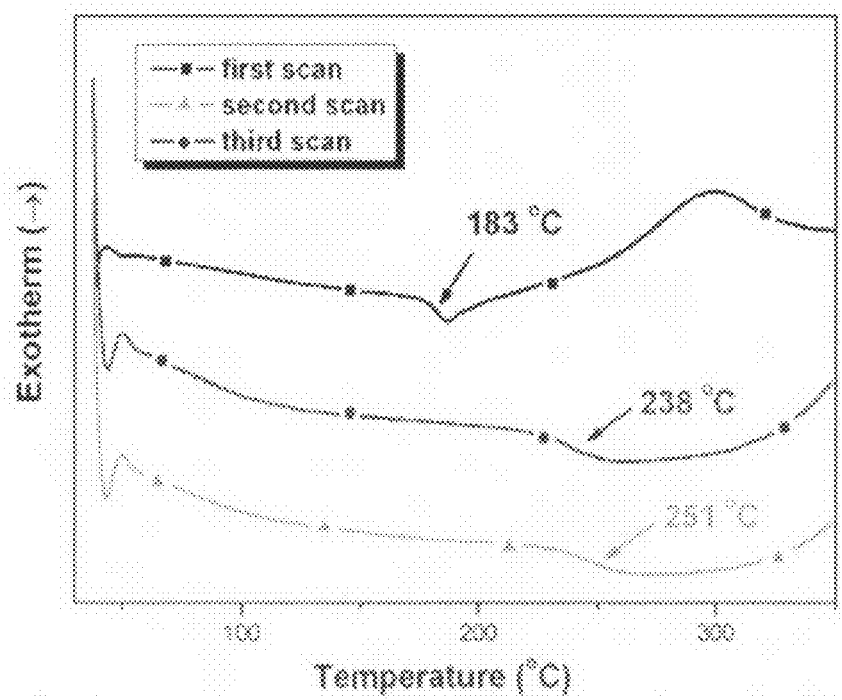
FIG. 35 is a graph illustrating Glass transition temperature of E-FPAESI-6F ($M_n$=31.1K) according to the number of thermal treatment.
Figure 36:
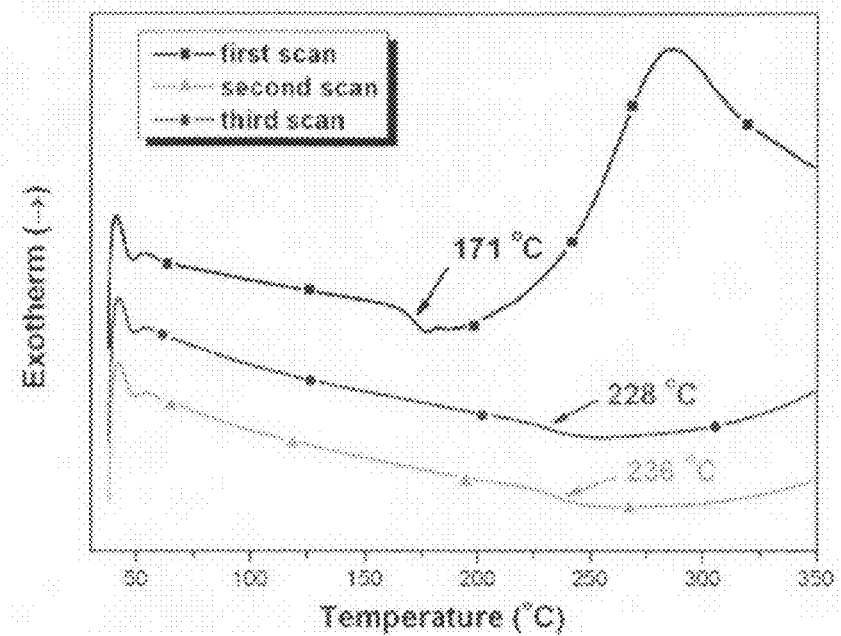
FIG. 36 is a graph illustrating Glass transition temperature of E-FPAESI-12F ($M_n$=22.2K) according to the number of thermal treatment.

[a]mole ratio of monomers (TPDO/pentafluorophenyl sulfide (mol/mol))
[b]theoretical number-average molecular weight
[c]obtained number-average molecular weight
[d]obtained weight-average molecular weight
e 140-188-191° C. (first scan Tg-second scan Tg-third scan Tg)
f 183-238-251° C. (first scan Tg-second scan Tg-third scan Tg)
g 171-228-236° C. (first scan Tg-second scan Tg-third scan Tg)
[h,i]first scan Tg FIGS. 34-35 represent glass transition temperature of each of E-FPAESI-TP, E-FPAESI-6F and E-FPAESI-12F according to the thermal treatment, respectively.

Figure 37:
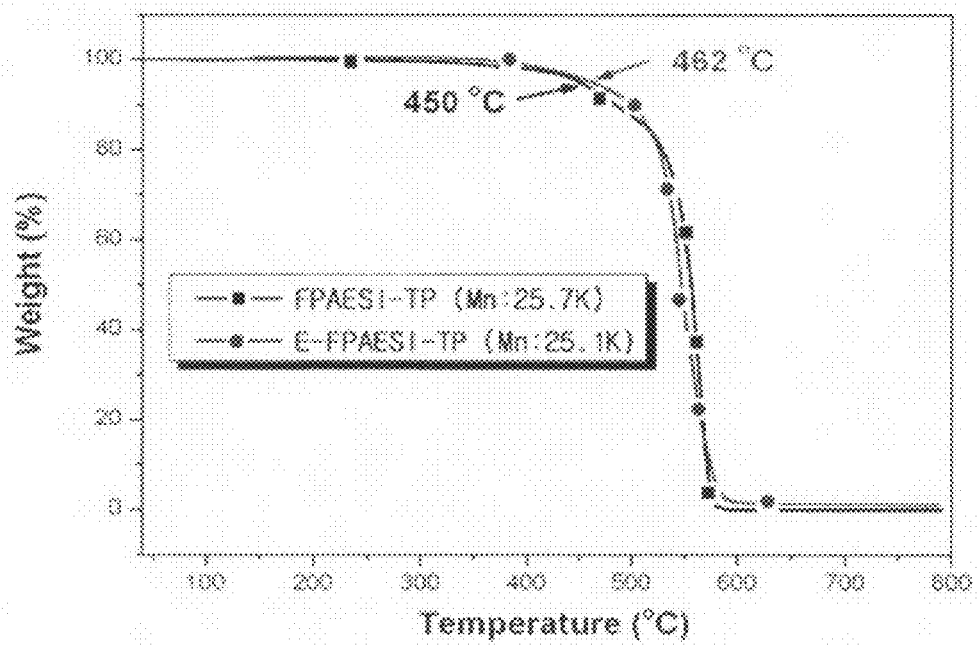
FIG. 37 is a graph illustrating Thermogravimetric analysis (TGA) of FPAESI-TP (M $M_n$=25.7K) and E-FPAESI-TP ($M_n$=25.1K).
Figure 38:
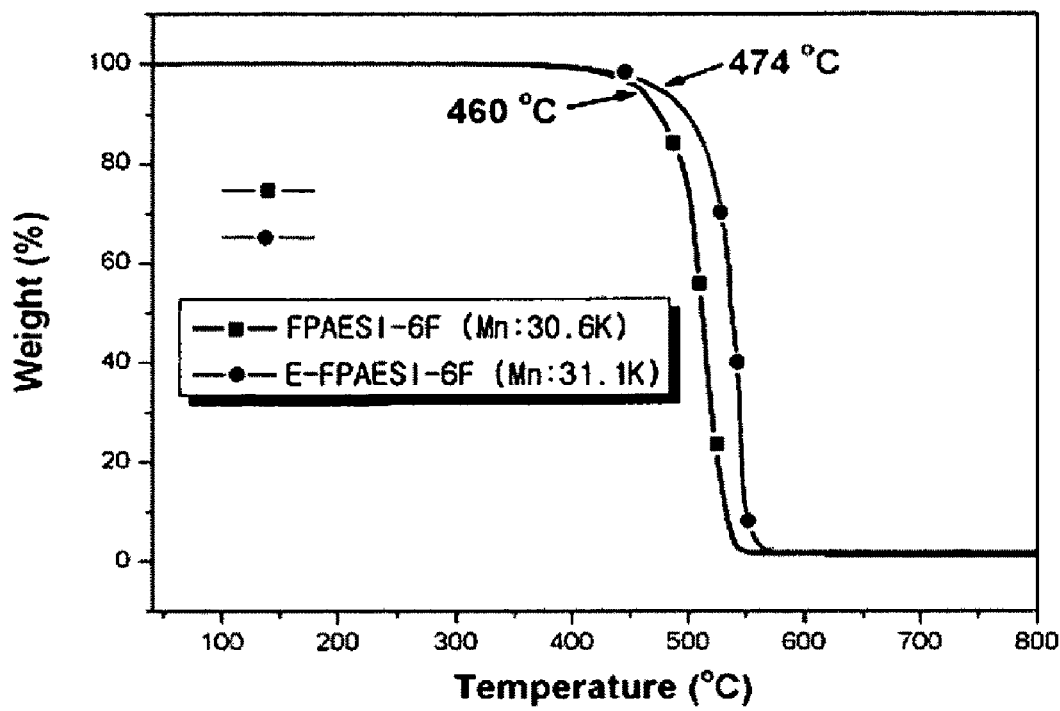
FIG. 38 is a graph illustrating Thermogravimetric analysis (TGA) of FPAESI-6F ($M_n$=30.6K) and E-FPAESI-6F ($M_n$=31.1K).
Figure 39:
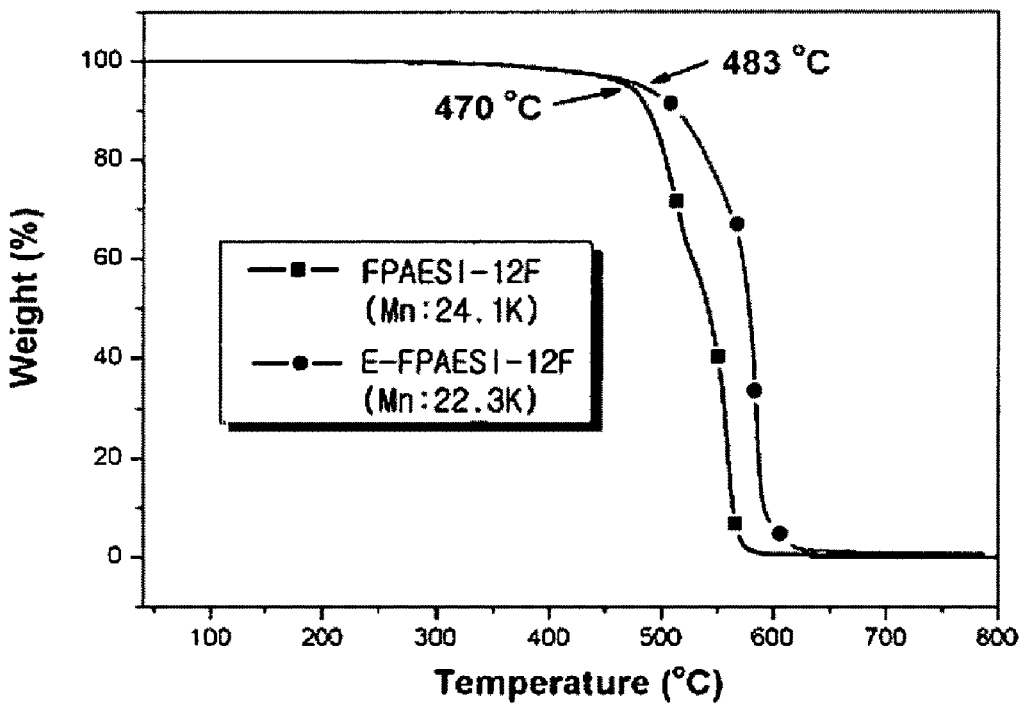
FIG. 39 is a graph illustrating Thermogravimetric analysis (TGA) of FPAESI-12F ($M_n$=24.1K) and E-FPAESI-12F ($M_n$=22.3K).

Since glass transition temperature generally increases with increase of degree of cross-linking, it was noted that the reaction occurred causing exothermic peak with increase in the number of scan as shown in the differential scanning calorimeter (DSC) graph. Glass transition temperature of E-FPAESIs was also increased with increase of degree of cross-linking. On the other hand, according to the thermogravimetric analysis of FIGS. 37-39, it was noted that the pyrolysis temperature (Td) of the polymer with cross-linkages showed greater thermal stability compared to that without a cross-linkage.

Refractive index and birefringence of E-FPAESIs are summarized in Table 5. It was noted that the refractive index decreased with increase of molecular weight since amount of fluorine contained in the polymer increased. It was also observed that refractive index and birefringence of E-FPAESI-TPs and FPAESI-TPs were much lower than those of E-FPAESI-12Fs and FPAESI-12Fs since morphology of the polymer has an amorphous structure due to increase of amount of fluorine and free volume of the polymer with —CF$_3$ bondings. Optical loss of E-FPAESIs was low, 0.4-0.5 dB/cm.

EFFECT OF THE INVENTION

As described above, novel monomers according to the present invention contain fluorine so that the polymer utilized with the monomers provides superior thermal stability, chemical stability, low optical losses, low refractive index, low dielectric constant, easy processability, and low moisture absorption rate, thus being useful as optical materials in the field of information telecommunications and production of highly efficient materials for optical waveguides.

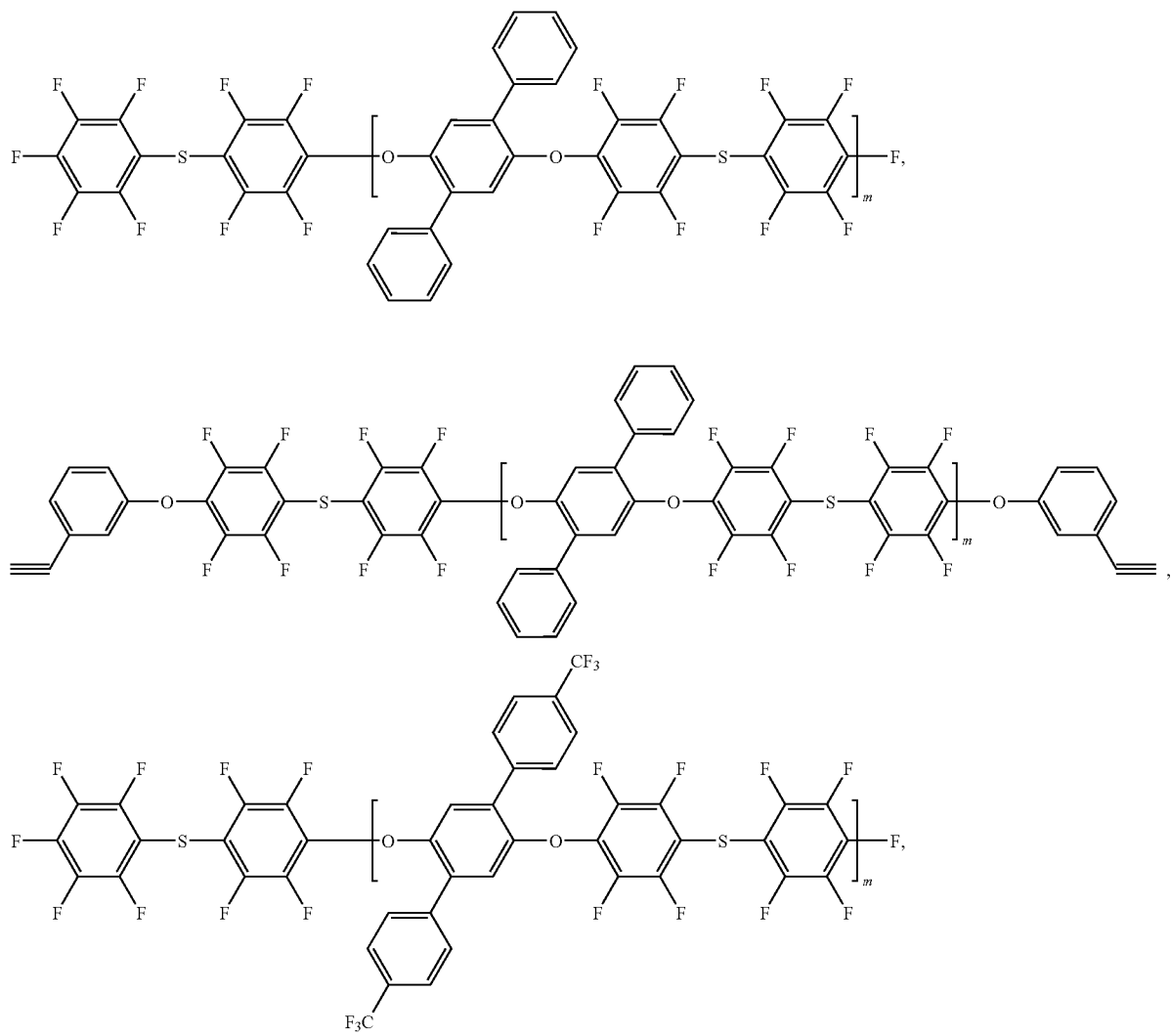

-continued
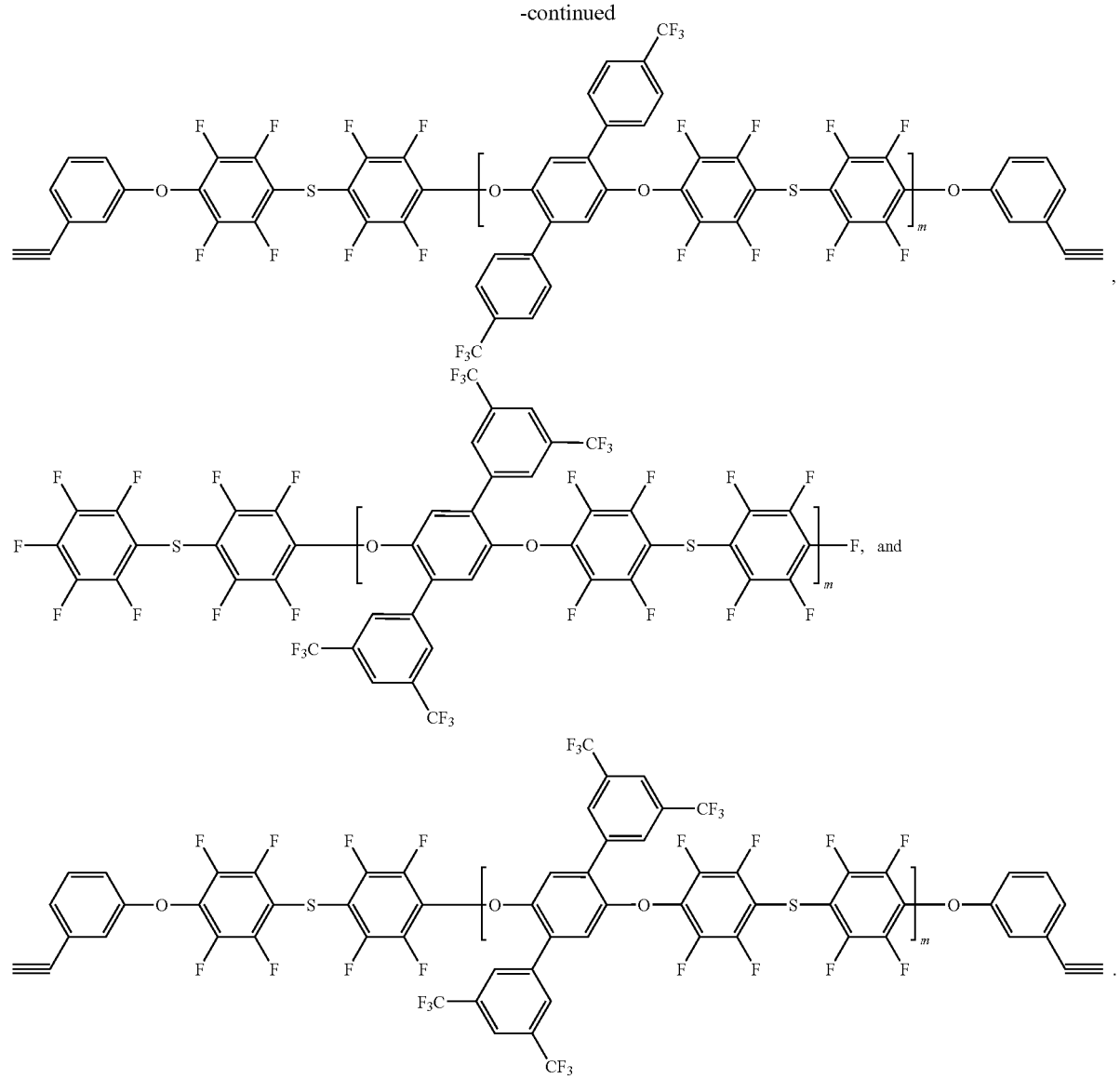

What is claimed is:

1. A poly(arylene ether sulfide) substituted with fluorine expressed by formula 6:

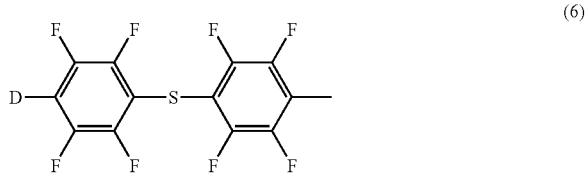

(6)

TABLE 5

| Polymer | Mole ratio[a] of monomer | M$_n$ theoretical[b] | M$_n$ obtained[c] | refractive index[d] | birefringence (Δn, ×10$^{-3}$)[e] |
|---|---|---|---|---|---|
| FPAESI-TP | 0.9390 | 10,174 | 11,625 | 1.5880/1.5845 | 3.5 |
| | 0.9600 | 15,077 | 16,055 | 1.5855/1.5824 | 3.1 |
| | 0.9701 | 20,047 | 21,725 | 1.5861/1.5827 | 3.4 |
| | 0.9762 | 25,092 | 25,712 | 1.5853/1.5826 | 2.7 |
| E-FPAESI-TP | 0.9480 | 11,683 | 12,018 | 1.5894/1.5852 | 4.2 |
| | 0.9762 | 25,092 | 25,067 | 1.5944/1.5899 | 4.5 |
| FPAESI-12F | 0.8144 | 5,002 | 5,434 | 1.5012/1.5007 | 0.5 |
| | 0.9107 | 10,002 | 10,871 | 1.5037/1.5024 | 1.3 |
| | 0.9261 | 12,010 | 12,373 | 1.5000/1.4985 | 1.5 |
| | 0.9413 | 15,025 | 17,977 | 1.4954/1.4948 | 0.6 |
| | 0.9651 | 25,021 | 24,082 | 1.4949/1.4940 | 0.9 |
| E-FPAESI-12F | 0.8144 | 5,002 | 7,707 | 1.5047/1.5043 | 0.4 |
| | 0.9562 | 20,011 | 22,293 | 1.4943/1.4934 | 0.9 |

[a]mole ratio of monomesr (TPDO/pentafluorophenyl sulfide (mol/mol))
[b]theoretical number-average molecular weight
[c]obtained number-average molecular weight
[d]refractive index determined with prism coupler
[e]birefringence determined with prism coupler -continued

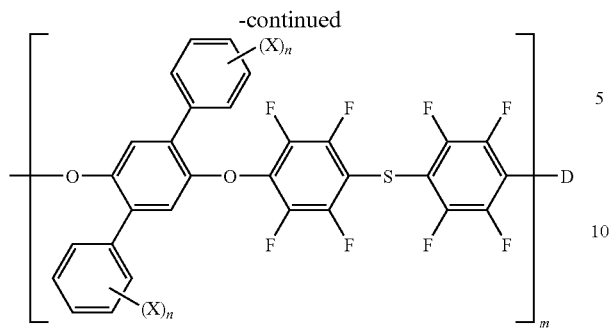

wherein D is a fluorine atom or an ethynylphenoxy group, X is a hydrogen atom, a fluorine atom, or a fluoroalkyl group having 1 to 6 carbon atoms, n represents the number of X as a substituent and is an integer of 1 to 5, and M represents the number of monomers.

2. The poly(arylene ether sulfide) substituted with fluorine of claim 1, wherein said poly(arylene ether sulfide) substituted with fluorine is selected from the group consisting of